(12) United States Patent
Iwata

(10) Patent No.: US 10,180,858 B2
(45) Date of Patent: Jan. 15, 2019

(54) PARALLEL COMPUTING DEVICE, PARALLEL COMPUTING SYSTEM, AND JOB CONTROL METHOD

(71) Applicant: FUJITSU LIMITED, Kawasaki-shi, Kanagawa (JP)

(72) Inventor: Akitaka Iwata, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 15/049,645

(22) Filed: Feb. 22, 2016

(65) Prior Publication Data

US 2016/0266935 A1    Sep. 15, 2016

(30) Foreign Application Priority Data

Mar. 9, 2015  (JP) ................. 2015-045742

(51) Int. Cl.
*G06F 9/46*   (2006.01)
*G06F 9/50*   (2006.01)

(52) U.S. Cl.
CPC ...... *G06F 9/5038* (2013.01); *G06F 2209/506* (2013.01); *G06F 2209/5014* (2013.01); *G06F 2209/5021* (2013.01)

(58) Field of Classification Search
CPC .................................................. G06F 9/5038
See application file for complete search history.

(56) References Cited

U.S. PATENT DOCUMENTS

2009/0288090 A1   11/2009  Ujibashi et al.
2012/0204184 A1   8/2012   Terashima et al.

FOREIGN PATENT DOCUMENTS

| JP | 2004-295478 | 10/2004 |
|----|-------------|---------|
| JP | 2006-048275 | 2/2006  |
| JP | 2009-277041 | 11/2009 |
| JP | 2012-79241  | 4/2012  |
| JP | 2012-215933 | 11/2012 |

OTHER PUBLICATIONS

Japanese Office Action dated Oct. 2, 2018 in corresponding Japanese Patent Application No. 2015-045742.

*Primary Examiner* — Emerson C Puente
*Assistant Examiner* — Steven M Do
(74) *Attorney, Agent, or Firm* — Staas & Halsey LLP

(57) ABSTRACT

A parallel arithmetic device includes a plurality of computing nodes; and a management node coupled to the plurality of computing nodes and including a computer, the management node being configured to calculate a degree of increasing a priority of each of a plurality of users, based on a degree of increasing the priority of the user depending on resource distribution to the user as time elapses and a difference between a current time instant and a future time instant, the priority being to be used in determining one of the plurality of users that has a job to which a computing resource at a first time instant being later than the current time instant is to be allocated.

8 Claims, 20 Drawing Sheets

FIG. 10

| | | BEFORE ALLOCATION | AFTER (1) | AFTER (2) | AFTER (3) | AFTER (4) | AFTER (5) | AFTER (6) | AFTER (7) | AFTER (8) | AFTER (9) | AFTER (10) |
|---|---|---|---|---|---|---|---|---|---|---|---|---|
| FAIR SHARE RESERVATION VALUE AT t0 | USER A | 40000 | 40000 | 30000 | 30000 | 30000 | 30000 | 30000 | 30000 | 30000 | 30000 | 30000 |
| | USER B | 45000 | 35000 | 35000 | 35000 | 35000 | 35000 | 35000 | 35000 | 35000 | 35000 | 35000 |
| FAIR SHARE RESERVATION VALUE AT t1 | USER A | 45000 | 45000 | 35000 | 35000 | 25000 | 25000 | 25000 | 25000 | 25000 | 25000 | 25000 |
| | USER B | 50000 | 40000 | 40000 | 30000 | 30000 | 30000 | 30000 | 30000 | 30000 | 30000 | 30000 |
| FAIR SHARE RESERVATION VALUE AT t2 | USER A | 50000 | 50000 | 40000 | 40000 | 30000 | 30000 | 20000 | 20000 | 20000 | 20000 | 20000 |
| | USER B | 55000 | 45000 | 45000 | 35000 | 35000 | 25000 | 25000 | 25000 | 25000 | 25000 | 25000 |
| FAIR SHARE RESERVATION VALUE AT t3 | USER A | 55000 | 55000 | 45000 | 45000 | 35000 | 35000 | 25000 | 25000 | 15000 | 15000 | 15000 |
| | USER B | 60000 | 50000 | 50000 | 40000 | 40000 | 30000 | 30000 | 20000 | 20000 | 20000 | 20000 |
| FAIR SHARE RESERVATION VALUE AT t4 | USER A | 60000 | 60000 | 50000 | 50000 | 40000 | 40000 | 30000 | 30000 | 20000 | 20000 | 10000 |
| | USER B | 60000 | 55000 | 55000 | 45000 | 45000 | 35000 | 35000 | 25000 | 25000 | 15000 | 15000 |
| FAIR SHARE RESERVATION VALUE AT t5 | USER A | 60000 | 60000 | 55000 | 55000 | 45000 | 45000 | 35000 | 35000 | 25000 | 25000 | 15000 |
| | USER B | 60000 | 60000 | 60000 | 50000 | 50000 | 40000 | 40000 | 30000 | 30000 | 20000 | 20000 |
| FAIR SHARE RESERVATION VALUE AT t6 | USER A | 60000 | 60000 | 60000 | 60000 | 50000 | 50000 | 40000 | 40000 | 30000 | 30000 | 20000 |
| | USER B | 60000 | 60000 | 60000 | 55000 | 55000 | 45000 | 45000 | 35000 | 35000 | 25000 | 25000 |
| FAIR SHARE RESERVATION VALUE AT t7 | USER A | 60000 | 60000 | 60000 | 60000 | 55000 | 55000 | 45000 | 45000 | 35000 | 35000 | 25000 |
| | USER B | 60000 | 60000 | 60000 | 60000 | 60000 | 50000 | 50000 | 40000 | 40000 | 30000 | 30000 |
| FAIR SHARE RESERVATION VALUE AT t8 | USER A | 60000 | 60000 | 60000 | 60000 | 60000 | 60000 | 50000 | 50000 | 40000 | 40000 | 30000 |
| | USER B | 60000 | 60000 | 60000 | 60000 | 60000 | 55000 | 55000 | 45000 | 45000 | 35000 | 35000 |
| FAIR SHARE RESERVATION VALUE AT t9 | USER A | 60000 | 60000 | 60000 | 60000 | 60000 | 60000 | 55000 | 55000 | 45000 | 45000 | 35000 |
| | USER B | 60000 | 60000 | 60000 | 60000 | 60000 | 60000 | 60000 | 50000 | 50000 | 40000 | 40000 |

~1001

PARALLEL COMPUTING DEVICE, PARALLEL COMPUTING SYSTEM, AND JOB CONTROL METHOD

CROSS-REFERENCE TO RELATED APPLICATION

This application is based upon and claims the benefit of priority of the prior Japanese Patent Application No. 2015-045742, filed on Mar. 9, 2015, the entire contents of which are incorporated herein by reference.

FIELD

The embodiments discussed herein are related to a parallel computing device, a parallel computing system, and a job control method.

BACKGROUND

Heretofore, there have been techniques of increasing a priority level of each of multiple users with a passage of time, the priority level being to be used to determine a user having a job to which a computing resource of a processor is to be allocated from among the multiple users. In one of the related techniques, the priority level is increased with a passage of time at a recovery rate depending on an amount of computing resource, which each user is allowed to use per unit time in response to an allocation of a computing recourse to a job. In another related technique, the date and time when a user will be allowed to make a firm reservation is calculated from reservation histories of the user, and a period from the date and time when the right will be executed to the date and time when a firm reservation will be allowed is set shorter for a user who has a larger number of reservation histories. Thus, opportunities to obtain reservations are evenly given to all the users. In a still another related technique, points to be paid for execution of a job are calculated based on an expected period of time for processing of the job and an entered deadline condition, and information on a registrant of the job is updated based on the calculated points.

Related techniques are disclosed in, for example, Japanese Laid-open Patent Publication Nos. 2009-277041, 2004-295478, and 2006-048275.

However, with the related techniques, if computing resources at a future time instant are allocated to jobs that users have based on the priorities of the users at the current time instant, the computing resource at the future time instant may not be allocated in a manner reflecting resource distribution among the users. Specifically, at a time of allocation of the computing resources at the future time instant, the time has not elapsed yet. For this reason, increases of the priorities of the users depending on the resources distribution among the users with a passage of unit time may not be considered and resultantly the resource distribution among the users may not be reflected in the allocation.

An aspect of the embodiments is intended to provide a parallel computing device, a parallel computing system, and a job control method that enable allocation of a computing resource at a future time instant to a job that each user has, while reflecting resource distribution among users.

SUMMARY

According to an aspect of the embodiments, a parallel arithmetic device includes a plurality of computing nodes; and a management node coupled to the plurality of computing nodes and including a computer, the management node being configured to calculate a degree of increasing a priority of each of a plurality of users, based on a degree of increasing the priority of the user depending on resource distribution to the user as time elapses and a difference between a current time instant and a future time instant, the priority being to be used in determining one of the plurality of users that has a job to which a computing resource at a first time instant being later than the current time instant is to be allocated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory drawing illustrating an example of a list of updates of fair share reservation values;

DESCRIPTION OF EMBODIMENTS

Embodiments of a parallel computing device, a parallel computing system, and a job control method of the present disclosure are described in detail hereinafter.

Figure 1:
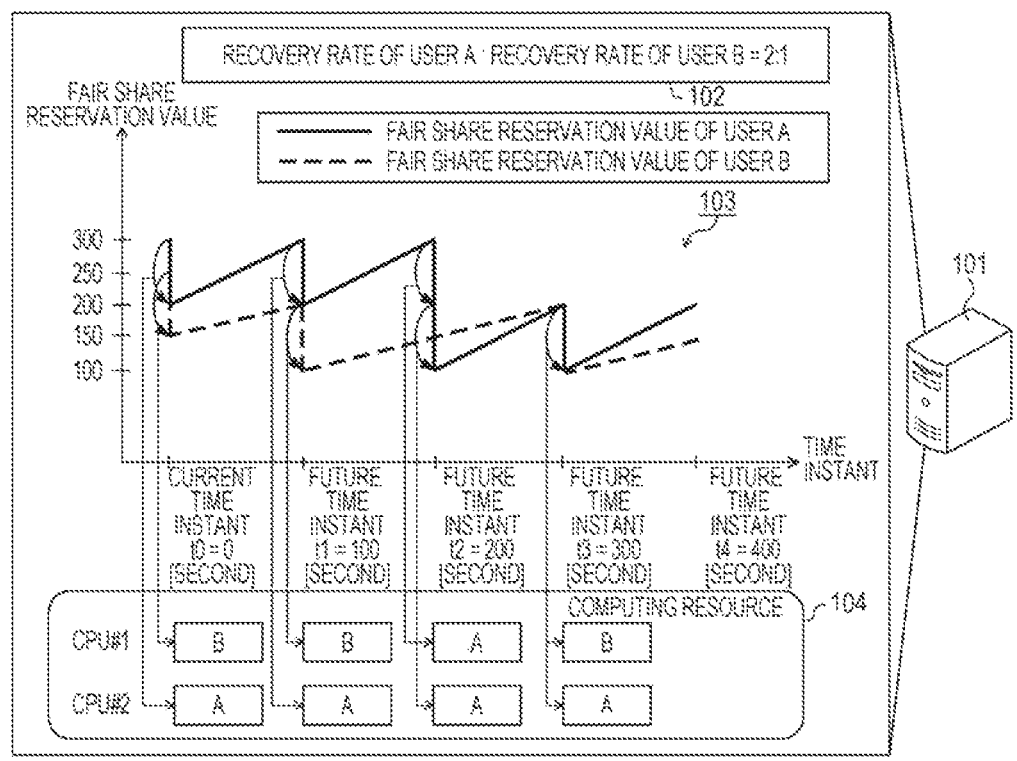
FIG. 1 is an explanatory drawing illustrating an operation example of a parallel computing device according to this embodiment.

FIG. 1 is an explanatory drawing illustrating an operation example of a parallel computing device 101 according to this embodiment. The parallel computing device 101 is a computer configured to allocate a computing resource to a job that each of multiple users has. For example, for a computing device having a single processor, the parallel arithmetic device 101 allocates a processor occupation time as a computing resource to a job that each user has. In addition, for a computing device having multiple processors, the parallel arithmetic device 101 also allocates computing resources of a value obtained by multiplying a processor occupation time by the number of processors to a job that each user has. The computing device having the multiple processors may be a computing device including a processor in which multiple cores are mounted or a computing device including a group of processors in which single-core processors are arranged in parallel. Alternatively, there may be multiple computing devices including single-core processors.

In addition, a computing device having a single arithmetic device or multiple arithmetic devices may be the parallel arithmetic device 101 or other device. The other device may be a clustered personal computer, for example. In the description of FIG. 1, for simplicity of the description, an example of a case of a group of processors in which two central processing units (CPUs), which are single-core processors, are arranged in parallel is described.

In addition, a job represents a unit of processes from a standpoint of a user. The concept similar to a job includes a process that is a unit of a program to be executed and has a unique memory space, or a thread that is a unit of a program to be executed and in which threads belonging to a same process share a memory space, or the like. Therefore, the parallel arithmetic device 101 may allocate a computing resource to multiple threads or multiple processes as multiple jobs.

A process to allocate a computing resource to a job is described hereinafter. A job scheduler configured to allocate a job sorts jobs input through user manipulation or the like based on the order of input or predetermined static priority. Here, the static priority is the priority between users. Then, the job scheduler searches and allocates an empty computing resource requested by a job in the order of jobs sorted based on the static priority of the user.

Here, if a job is allocated only following the static priority, a job of a user with the high static priority or a job input earlier by a certain user may exclusively occupy the computing resource. Then, the job scheduler allocates a job based on the dynamic propriety of the user that is updated in operation as occasion calls. Specifically, when a user is currently using a large amount of computing resources or when execution time of a job currently being executed is long, the job scheduler lowers the dynamic priority of the user and sets the dynamic priority of other users relatively higher.

The dynamic priority may take either a larger value or smaller value to indicate a higher priority of allocation to a job of each user. Then, the dynamic priority may be a specific numeric value or a rank such as "high of high", "medium of high", "low of high", "high of medium", "medium of medium", "low of medium", "high of low", "medium of low", or "low of low", for example.

Here, a case is considered in which a computing resource at the future time instant later than the current time instant is to be allocated to a job using the dynamic priority and job allocation is reserved. Allocating a computing resource at the future time to a job instant may be hereinafter simply referred to as "future allocation". For example, performing future allocation may enable identification of an empty computing resource to which a job of the high dynamic priority in the future time instant is not allocated. Then, a technique referred to as "backfill" may be performed that allocates the identified empty computing resource to a job of the low dynamic priority so that starting of execution of the job of the high dynamic priority is not delayed. In addition, by performing the future allocation, a user having a job to which the future allocation is performed may be notified of job end time.

However, if a computing resource at the future time instant is allocated to a job of each user by using the priority of the user at the current time instant, the computing resource at the future time instant may be allocated without reflecting resource distribution among users. Specifically, at a time of allocation of the computing resources at the future time instant, the time has not elapsed yet. For this reason, increases of the priorities of the users depending on the resources distribution among the users with a passage of unit time may not be considered and resultantly the resource distribution among the users may not be reflected in the allocation. In addition, it becomes more difficult to monitor an amount of computing resources allocated to jobs as the numbers of jobs and processors increase. Here, one of reasons for desire to reflect the resource distribution among users is, for example, an intention to make the resource distribution among users closer to a ratio between a money amount paid by a user A to use a computing device and a money amount paid by a user B to use the computing device.

Thus, the parallel arithmetic device 101 according to this embodiment calculates, as a value to be used in allocation of a computing resource at the future time instant, a value obtained by multiplying a degree of increasing the priority of each user depending on resource distribution to the user as the unit time elapses by a difference between the current time instant and the future time instant. This allows the parallel arithmetic device 101 to reflect the resource distribution among users and properly distribute the resources at the future time instant.

Here, when the dynamic priority of a user is a numeric value, the degree of increasing the priority of each user depending on resource distribution to the user as the unit time elapses takes a value larger than 1 which is to be multiplied by the dynamic priority of the user. Instead, this degree of increasing may take a value larger than 0 which is to be added to the dynamic priority of the user.

For example, suppose that the dynamic priority is a rank such as "high of high", . . . , "low of low". Then, suppose the dynamic priority at the current time instant of both users A, B is "low of low". Then, suppose that the degree of increasing is 2 ranks for the user A and 1 rank for the user B.

Then, the parallel arithmetic device 101 calculates the degree of increasing the dynamic priority of the user A at the future time instant which is 3 unit times after the current time instant to be 6 ranks by multiplying the recovery rate of the user A 2 by 3 unit times. Then, the parallel arithmetic device 101 determines that the dynamic priority of the user A at the future time instant, which is 3 unit times after the current time instant, is "low of high" that is made 6 ranks higher than "low of low".

Similarly, the parallel arithmetic device 101 calculates the degree of increasing the dynamic priority of the user B at the future time instant which is 3 unit times after the current time instant to be 3 ranks by multiplying the recovery rate of the user B 1 by 3 unit times. Then, the parallel arithmetic device 101 determines that the dynamic priority of the user B at the future time instant, which is 3 unit times after the current time instant, is "low of medium" that is made 3 ranks higher than "low of low". Then, the parallel arithmetic device 101 determines a user to which the computing resource at the future time instant, which is 3 unit times after the current time instant, based on the priority of users A, B at the future time instant.

In the following description, a case of using a value called "fair share value" is used as the dynamic priority at the current time instant. A fair share value has a fair share initial value as an upper limit and does not become larger than the fair share initial value. In addition, a fair share value may be a negative value. A fair share value is a value that becomes larger as the priority of a job that each user has in allocation becomes higher. Then, the dynamic priority at the future time instant is hereinafter referred to as a "fair share reservation value". In addition, a degree of reducing a user's fair share value as a computing resource is allocated to a job of each user may be hereinafter is referred as a "fair share use amount".

Then, the degree of increasing the priority of each user depending on resource distribution to the user as unit time elapses shall be a value obtained by multiplying a value of commonly increasing the priorities of users as the unit time elapses by a rate depending on the resource distribution to the user. The value of commonly increasing the priorities of users as the unit time elapses is hereinafter referred to as a "recovery value per unit time". In addition, a rate depending on resource distribution to each user is hereinafter referred to as "user recovery rate". In addition, a value obtained by multiplying a recovery value per unit time by a user recovery rate is referred to as a "user recovery value per unit time".

Processing of the parallel arithmetic device 101 is described with reference to FIG. 1. The parallel arithmetic device 101 as illustrated in FIG. 1 has a CPU#1 and a CPU #2. The parallel arithmetic device 101 is also configured to perform a job of the user A and a job of the user B. In addition, as depicted by a reference numeral 102, a ratio of the recovery rate of the user A and the recovery rate of the user B is 2:1. Therefore, in FIG. 1, a target is to make a computing resource to be allocated to the user A closer to twice of a computing resource to be allocated to the user B.

Here, in the example of FIG. 1, the user A may have multiple jobs, perform a single job many times, or perform a single job simultaneously. The same shall also apply to a job of the user B. Then, when a job is performed once, the job shall request computing resources of 100 obtained by multiplying 100 seconds by 1 CPU. In addition, for simplicity of the description, when a fair share value of the user A is of a same value as a fair share value of the user B, the parallel arithmetic unit 101 preferentially allocates a computing resource to the job of the user B.

In addition, a recovery value per unit time is 0.5. Therefore, a recovery value of the user A per unit time is 1. In addition, a recovery value of the user B per unit time is 0.5. In addition, in the example of FIG. 1, at the current time instant t0, a fair share value of the user A is 300 and a fair share value of the user B is 250. FIG. 1 illustrates an example in which a computing resource at the current time instant and at the future time instant are allocated using a fair share reservation value. A fair share reservation value at the current time instant has a same value as the fair share value.

A graph 103 illustrated in FIG. 1 illustrates a time scale change of a fair share reservation value when a computing resource is allocated to a job of each user according to the fair share reservation value. In addition, a frame 104 is a schematic representation of computing resources. The horizontal axis of the graph 103 represents time instant. The vertical axis of the graph 103 represents a fair share reservation value. In addition, in the graph 103, not only a time scale change in the fair share reservation value of the user A is depicted in a solid line, but also a time scale change in the fair share reservation value of the user B in a dashed line.

At the current time instant t0 of 0 [seconds], since the fair share reservation value of the user A is 300 and the fair share reservation value of the user B is 250, the parallel arithmetic device 101 determines to allocate a computing resource at a time instant t0 to the job of the user A. Then, since there is a computing resource requested by the job of the user A at the time instant t0, the parallel arithmetic device 101 determines to allocate 0 to 100 [seconds] of the CPU #2 to the job of the user A. Then, the parallel arithmetic device 101 subtracts 100 from the fair share reservation value of the user A after the time instant t0. For example, the parallel arithmetic device 101 sets 200 obtained by subtracting 100 from 300 as the fair share reservation value of the user A at the time instant t0.

When allocating a computing resource to a new job, the parallel arithmetic device 101 judges whether allocation is possible from the current time instant again. At the current time instant t0 of 0 [seconds], since the fair share reservation value of the user A is 200 and the fair share reservation value of the user B is 250, the parallel arithmetic device 101 determines to allocate a computing resource at the time instant t0 to the job of the user B. Then, since a computing resource requested by the job of the user B is available at the time instant t0, the parallel arithmetic device 101 determines to allocate 0 to 100 [seconds] of the CPU #1 to the job of the user B. Then, the parallel arithmetic device 101 subtracts 100 from the fair share reservation value of the user B after the time instant t0. For example, the parallel arithmetic device 101 sets 150 obtained by subtracting 100 from 250 as the fair share reservation value of the user B at the time instant t0.

As described earlier, when allocating a computing resource to a new job, the parallel arithmetic device 101 judges whether allocation from the current time instant is possible again. At the current time instant t0 of 0 [seconds], since a fair share reservation value of the user A is 200 and the fair share reservation value of the user B is 150, the parallel arithmetic device 101 determines to allocate a computing resource at the time instant t0 to the job of the user A.

However, since the computing resource requested by the job of the user A is unavailable at the time instant t0, the parallel arithmetic device 101 determines a user that has a job to which a computing resource at a time instant t1 of 100 [seconds] is to be allocated, where the time instant t1 is a first time instant that is later than the time instant t0. Then, the parallel arithmetic device 101 calculates a value to increase a fair share reservation value at the time instant t1, which is used to calculate the fair share reservation value at the time instant t1, as a value obtained by multiplying a user recovery value per unit time with a difference between the time instant t1 and the current time instant. In the example of FIG. 1, the parallel arithmetic device 101 calculates the value to increase the fair share reservation value of the user A at the time instant t1, and obtains 100 by multiplying 1 by (100 minus 0). The parallel arithmetic device 101 also calculates a value to increase the fair share reservation value of the user B at the time instant t1 and obtains 50 by multiplying 0.5 by (100 minus 0).

Then, the parallel arithmetic device 101 calculates a sum of the value to increase the fair share reservation value of each user at the time instant t1 and the fair share reservation value at the current time instant, as a fair share reservation value of each user at the time instant t1. In the example of FIG. 1, the parallel arithmetic device 101 calculates a fair share reservation value of the user A at the time instant t1 and obtains 300 by adding up 200 and 100. The parallel arithmetic device 101 calculates a fair share reservation value of the user B at the time instant t1, and obtains 200 by adding up 150 and 50.

Strictly speaking, the current time instant when the fair share reservation value of each user at the time instant t1 is calculated is the time instant that is slightly later than the current time instant when the value to increase the fair share reservation value of each user at the time instant t1 is calculated. However, a difference between the two current time instants is minute, and the fair share reservation values at the two current time instants may be treated as a same value.

Then, the parallel arithmetic device 101 determines a user that has a job to which a computing resource at the time instant t1 is allocated, based on the fair share reservation value of each user at the time instant t1 of 100 [seconds]. In the example of FIG. 1, since the fair share reservation value of the user A is 300 and the fair share reservation value of the user B is 200, the parallel arithmetic device 101 determines to allocate the computing resource at the time instant t1 to the job of the user B. Then, at the time instant t1, since there is a computing resource requested by the job of the user A, the parallel arithmetic device 101 determines to allocate a time instant t1 of 100 to 200 [seconds] of the CPU #2 to the job of the user A.

Then, the parallel arithmetic device 101 repeats till there is no unallocated job. The graph 103 illustrates an example in which a future time instant t2 of 200 to t3 of 300 [seconds] and a future time instant t3 of 300 to t4 of 400 [seconds] are allocated. At the future time instants t1 to t4, a ratio of job allocation between the user A and the user B is 4:2 which is equal to 2:1. In the example of FIG. 1, computing resources allocated to the user A is twice of computing resources to be allocated to the user B. In this manner, the parallel arithmetic device 101 may distribute resources reflecting the resource distribution among users, by using computing resources at the future time instants based on the fair share reservation value of each user.

Note that in the description above, although the parallel arithmetic device 101 allocates the computing resource at the future time instant based on the fair share reservation value of each user, the parallel arithmetic device 101 may allocate a computing resource based on the fair share reservation value of each user group that has more than one user. In addition, in the above description, after calculating the value to increase the fair share reservation value of each user at the time instant t1, the parallel arithmetic device 101 calculates the fair share reservation value of each user at the time instant t1. However, this is not only the case. For example, a device configured to calculate a value to increase a fair share reservation value of each user at the time instant t1 may differ from a device configured to calculate the fair share reservation value of each user at the time instant t1. Next, FIG. 2 illustrates an example in which the parallel arithmetic device 101 is applied to a parallel computing system 200.

Figure 2:
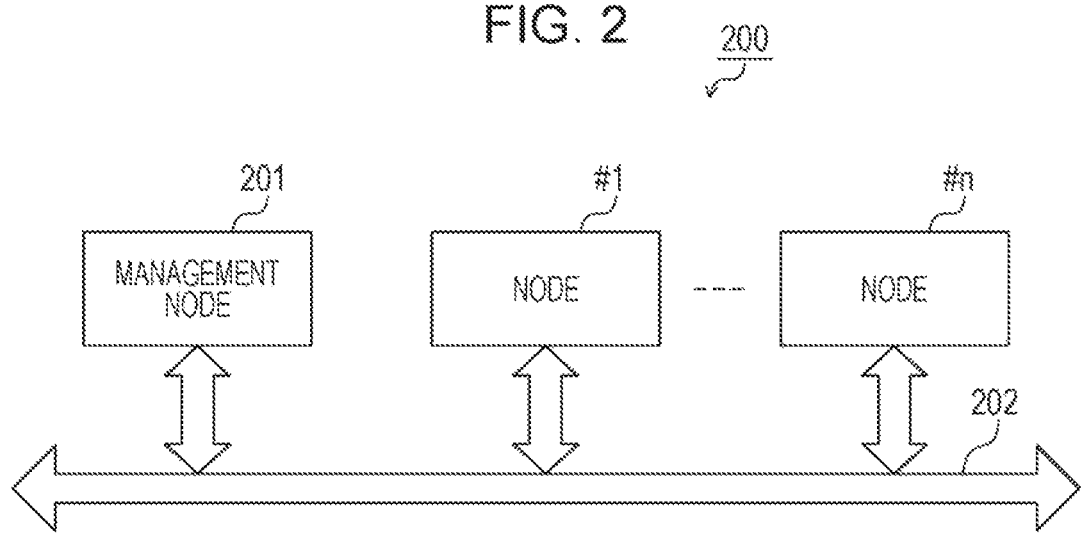
FIG. 2 is a block diagram illustrating a hardware configuration example of a parallel computing system.

FIG. 2 is a block diagram illustrating a hardware configuration example of the parallel computing system 200. The parallel computing system 200 has a management node 201, and computing nodes #1 to #n as multiple computing nodes. n is an integer of 2 or higher. Here, the management node 201 corresponds to the parallel arithmetic device 101 illustrated in FIG. 1. The computing nodes #1 to #n correspond to the CPUs #1, #2 in FIG. 1. The management node 201 and the computing nodes #1 to #n are connected by an interconnect 202. The parallel computing system 200 is a super computer, for example.

The management node 201 is a device configured to allocate to a job at least computing nodes #1 to #n out of the management node 201 and the computing nodes #1 to #n. The computing nodes #1 to #n are a device configured to perform an allocated computing node. In the description below, the management node 201 allocates a job in the unit of a computing node.

Figure 3:
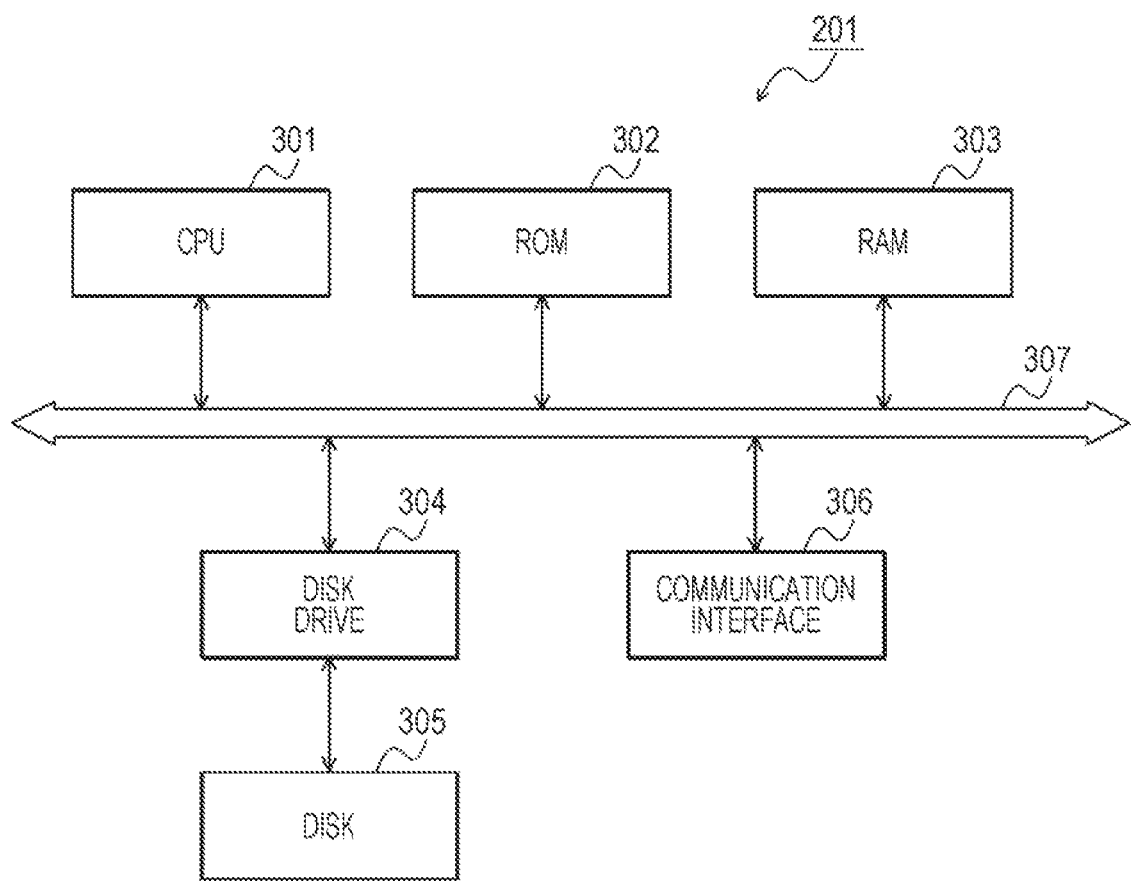
FIG. 3 is a block diagram illustrating one example of hardware of a management node.

FIG. 3 is a block diagram illustrating one example of hardware of the management node 201. In FIG. 3, the management node 201 includes a CPU 301, a read only memory (ROM) 302, and a random access memory (RAM) 303. The management node 201 also includes a disk drive 304, a disk 305, and a communication interface 306. In addition, the CPU 301 to the disk drive 304, and the communication interface 306 are respectively connected by a bus 307.

The CPU 301 is an arithmetic processing device that controls the entire management node 201. The management node 201 may also have multiple CPUs. The ROM 302 is a nonvolatile memory that stores a program such as a boot program. The RAM 303 is a volatile memory to be used as a work area of the CPU 301.

The disk drive 304 is a control device configured to control read and write of data to or from the disk 305, following control of the CPU 301. For example, a magnetic disk drive, an optical disk drive, a solid state drive, or the like may be adopted for the disk drive 304. The disk 305 is a nonvolatile memory that stores data written under the control of the disk drive 304. For example, when the disk drive 304 is a magnetic disk drive, the disk 305 may adopt a magnetic disk. In addition, when the disk drive 304 is an optical disk drive, the disk 305 may adopt an optical disk. In addition, when the disk drive 304 is a solid state drive, the disk 305 may adopt a semiconductor memory formed of semiconductor devices, so-called a semiconductor disk.

The communication interface 306 is a control device configured to manage a network and an internal interface and control input and output of data from other devices. Specifically, the communication interface 306 is connected to other devices by way of a network through a communication circuit. The communication interface 306 may adopt a modem or a local area network (LAN) adaptor, for example.

In addition, when a manager of the parallel computing system 200 directly operates the management node 201, the management node 201 may have such hardware as a display, a keyboard, a mouse. In addition, the computing nodes #1 to #n may also have hardware similar to the management node 201, though the hardware is not illustrated.

(Functional Configuration Example of the Management Node 201)

Figure 4:
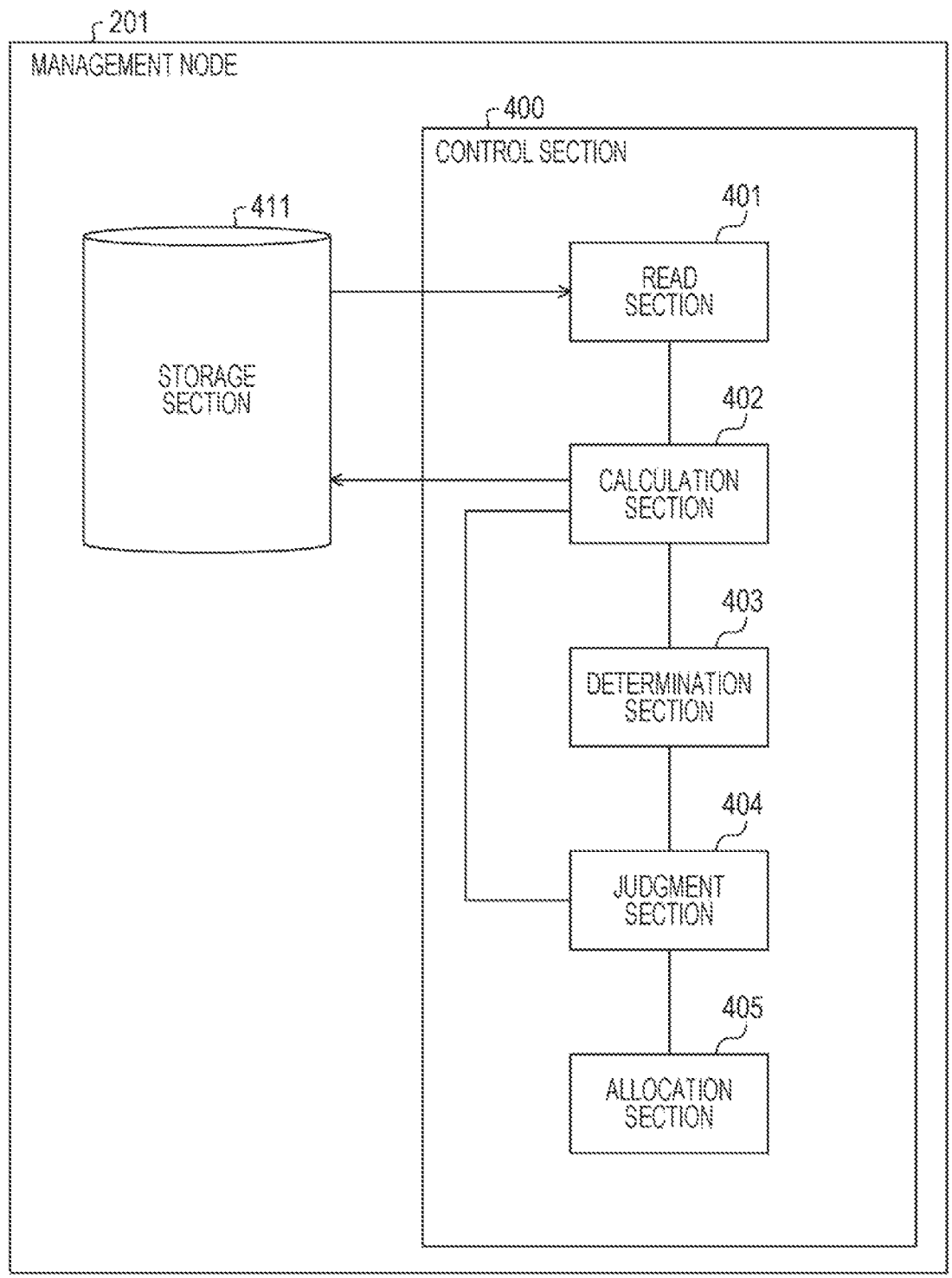
FIG. 4 is a block diagram illustrating a functional configuration example of the management node.

FIG. 4 is a block diagram illustrating a functional configuration example of the management node 201. The management node 201 has a control section 400. The control section 400 has a read section 401, a calculation section 402, a determination section 403, a judgment section 404, and an allocation section 405. The control section 400 implements functions of respective sections by CPU 301 executing a program stored in a storage device. Specifically, a storage device is, for example, the ROM 302, the RAM 303, the disk 305, or the like, illustrated in FIG. 3. In addition, a processing result of each unit is stored in a register of the CPU 301, a cache memory of the CPU 301, or the like.

In addition, the management node 201 has access to a storage section 411. The storage section 411 is a storage device such as the RAM 303 or the disk 305. The storage section 411 has a fair share reservation value list that summarizes a fair share initial value of each user, a recovery value per unit time, a recovery rate of each user, a fair share value of each user, a fair share reservation value of each user at a future time instant.

In addition, the storage section 411 stores scheduling information indicating status of job allocation at future time instance according to this embodiment. The scheduling information may also include job allocation status at the current time instant. For example, with reference to the example of FIG. 1, the scheduling information indicates that a job of the user A is allocated at the current time instant t0 to the future time instant t1 of a CPU #2, . . . , and that a job of the user B is allocated at the future time instant t3 to the future time instant t4 of a CPU #1.

The fair share reservation value list is an array prepared at every interval of a fair share reservation value specified in advance by a manager of the parallel computing system 200. Each array element of the fair share reservation value list has a member tt that stores a time instant of the array element and an array member fs that stores a fair share reservation value of each user. fs is an array for each user. An element at the head of the fair share reservation value list stores information at the current time instant. In addition, second and following array elements of the fair share reservation value list store information of second and following time instants at the fair share reservation value intervals.

The read section 401 reads a user recovery value per unit time from the storage section 411.

The calculation section 402 calculates a value to increase a fair share reservation value of each user to be used in determination of a user that has a job to which a computing resource at the first time instant is to be allocated, based on the read user recovery value per unit time and a difference between the current time instant and the first time instant.

In addition, the calculation section 402 may calculate a fair share reservation value of each user at the first time instant based on the calculated value to increase the fair share reservation value of each user and a fair share reservation value of each user at the current time instant. For example, suppose that the calculation section 402 calculates the value to increase the fair share reservation value of the user A calculated to be 100. Then, suppose that the fair share reservation value of the user A at the current time instant is 200. Then, the calculation section 402 calculates the fair share reservation value of each user at the first time instant, and obtains 300 by adding up 100 and 200. The calculation section 402 stores the calculated fair share reservation value in an element to which a user and time of the fair share reservation value list correspond.

Based on the fair share reservation value of each user at the first time instant calculated by the calculation section 402, the determination section 403 determines a user that has a job to which a computing resource at the first time instant is to be allocated from multiple users. For example, the determination section 403 determines a user that has the largest fair share reservation value at the first time instant as the user that has a job to which the computing resource at the first time instant is to be allocated. Alternatively, when more than one user having the largest fair share reservation value is present, the determination section 403 may determine a user that has a job issued earlier as the user having a job to which the computing resource at the first time instant is to be allocated.

The judgment section 404 judges whether or not a computing resource requested by a job of the user, determined by the determination section 403 to receive allocation of the computing resource at the first time instant, is available at the first time instant. Specifically, the judgment section 404 refers to scheduling information to identify an empty computing resource at the first time instant. Then, the judgment section 404 judges whether or not the identified empty resource meets the computing resource requested by the job of the determined user.

Then, based on a result of judgment made by the judgment section 404, the determination section 403 may determine to allocate the computing resource at the first time instant to the job of the user. If the determination section 403 determines to allocate, the determination section 403 stores information that the computing resource at the first time instant is to be allocated to the job of the user into the scheduling information.

Then, suppose that the judgment section 404 judges that the computing resource requested by the job of the determined user is available at the first time instant. Then, the management node 201 reduces the fair share reservation value of the determined user at any time instant of either the first time instant or a second time instant, which is later than the first time instant, by a fair share use amount resulting from the allocation of the computing resource at the first time instant. Specifically, the calculation section 402 calculates a fair share reservation value of the user at any time instant based on a value to increase the fair share reservation value of the user at any time instant, the fair share reservation value of the user at the current time instant, and the fair share use amount.

For example, with reference to the example of FIG. 1, the management node 201 allocates to the job of the user A, a future time instant t1 of 100 [seconds] to t2 of 200 [seconds], which is a future time instant, as the first time instant. Then, the suppose that a value to increase the fair share reservation of the user A at the future time instant t1 is 100 which is obtained by multiplying 1 by 100. In addition, suppose that the fair share reservation value at the current time instant t0 is 200. Then, suppose that the fair share use amount is 100.

In this case, as the fair share reservation value of the user A at the future time instant t1, the calculation section 402 calculates a value obtained by subtracting the fair share use amount from a sum of the fair share reservation value at the current time instant t0 and the value to increase the fair share reservation value of the user A at the future time instant t1.

More specifically, the calculation section 402 calculates the fair share reservation value of the user A at the future time instant t1 and obtains 200 by calculating a sum of 200 and 100 and then subtracting 100 from the sum.

Similarly, suppose that a value to increase a fair share reservation value of the user A at a future time instant t2, which is a second time instant later than the first time instant, is 200 which is obtained by multiplying 1 by 200. As the fair share reservation value of the user A at the future time instant t2, the calculation section 402 calculates a value obtained by subtracting the fair share use amount from a sum of the fair share reservation value at the current time instant t0 and the fair share reservation value of the user A at the future time instant t2. More specifically, the calculation section 402 calculates the fair share reservation value of the user A at the future time instant t1 and obtains 300 by calculating a sum of 200 and 200, and subtracting 100 from the sum.

Also suppose that the judgment section 404 judges that the computing resource requested by the job of the determined user is not available at the first time instant t1. Then, based on the fair share reservation value of each user at the second time instant, which is later than the first time instant, the determination section 403 may determine a user that has a job to which a computing resource at the second time instant is to be allocated, from multiple users.

Also suppose that the user determined to receive allocation of the computing resource at the first time instant differs from the user determined to receive allocation of the computing resource at the second time instant. In this case, the judgment section 404 judges whether or not a computing resource requested by the job of the user determined to receive allocation of the computing resource at the second time instant is available at the first time instant.

In addition, based on the a result of the judgment made, the determination section 403 may determine to allocate the computing resource at the first time instant to the job of the user determined to receive allocation of the computing resource at the second time instant. Specifically, the judgment section 404 refers to the scheduling information to identify an empty computing resource at the first time instant. Then, the judgment section 404 judges whether or not the identified empty resource meets the computing resource requested by the job of the user determined to receive allocation of the computing resource at the second time instant.

The allocation section 405 refers to the scheduling information and allocates the computing node to the job determined to receive allocation when an allocation time instant of the job comes.

Next, a fair share update example when resources at a future time instant are distributed according to a fair share reservation value is described with reference to FIGS. 5 to 10. In the example of FIGS. 5 to 10, jobs waiting for execution are input in the ascending order of a job number. Then, jobs with the job numbers j1, j2, j5, j6, j9 are jobs input by the user A, and jobs with the job numbers j3, j4, j7, j8, j10 are jobs input by the user B. In addition, in all jobs, computing resources requested by each job are 10000 which is obtained by multiplying 100 computing nodes by 100 [seconds], and the job is supposed to end after using up exclusive use time of 100 [seconds]. Here, the above-mentioned job conditions are for description in an easy-to-understand manner, and each job may have an individual computing resource and individual exclusive use time. In addition, suppose that the number of computing nodes used by the parallel computing system 200 is 200.

Then, suppose that a fair share initial value of both the user A and the user B is 60000. Also suppose that a fair share value of the user A at the current time instant t0 is 40000. Also suppose that that a fair share value of the user B at the current time instant t0 is 45000. Then, suppose that a recovery value per unit time is 50. Then, suppose that the user recovery rate of the user A is 1 and the user recovery rate of the user B is 1, so that a ratio of the user A recovery rate and the user B recovery rate is 1:1. In FIGS. 5 to 10, a target is to fairly distribute computing resources to the users A, B. In addition, (1) to (10) depicted in FIGS. 5 to 10 and (1) to (10) in the description of FIGS. 5 to 10 represent order of job allocation.

Figure 5:
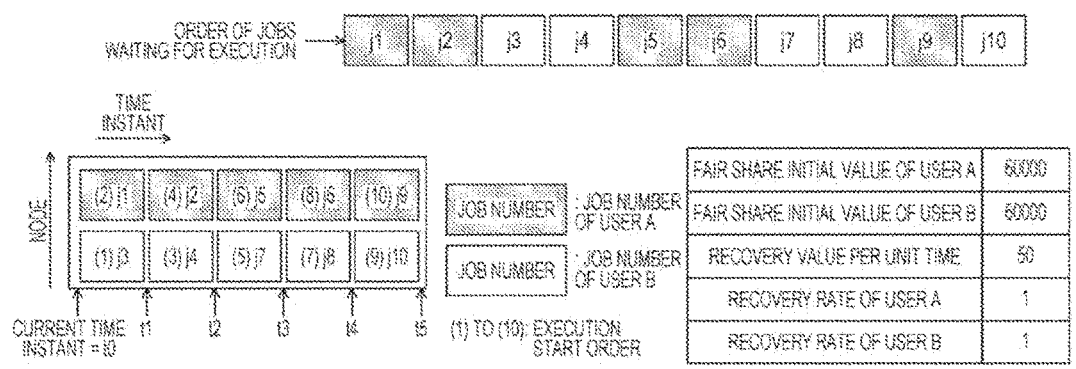
FIG. 5 is an explanatory drawing illustrating one example when resources at a future time instant are distributed according to a fair share reservation value.

FIG. 5 is an explanatory drawing illustrating one example when resources at the future time instant are distributed according to a fair share reservation value. In addition, FIGS. 6A to 9B are each an explanatory drawings (1) to (4) illustrating an update example of a fair share reservation value when resources at a future time instant are distributed according to a fair share reservation value. Specifically, FIGS. 6A to 9B illustrate a case in which a job unallocated state continues, and graphs 601 to 603, 701 to 703, 801 to 803, 901, and 902 that illustrate a fair share reservation value after (1) to (10). The horizontal axis of the graphs 601 to 603, 701 to 703, 801 to 803, 901, and 902 represents a time instant, and the vertical axis is a fair share reservation value. In addition, thick dotted line in the graphs 601 to 603, 701 to 703, 801 to 803, 901, and 902 represent a fair share reservation value of the user A, and thick solid line represents a fair share reservation value of the user B.

In FIG. 5, the order of job allocation by the current time instant t0, the future time instant t1 to the future time instant t5 is illustrated by (1) to (10) of FIG. 5. Here, the future time instant t1 is a future time instant when exclusive use time elapses from the current time instant t0. Then, for an integer n of 2 or higher, the future time instant t(n) is a future time instant when exclusive use time elapses from the future time instant t (n−1).

Figure 6A:
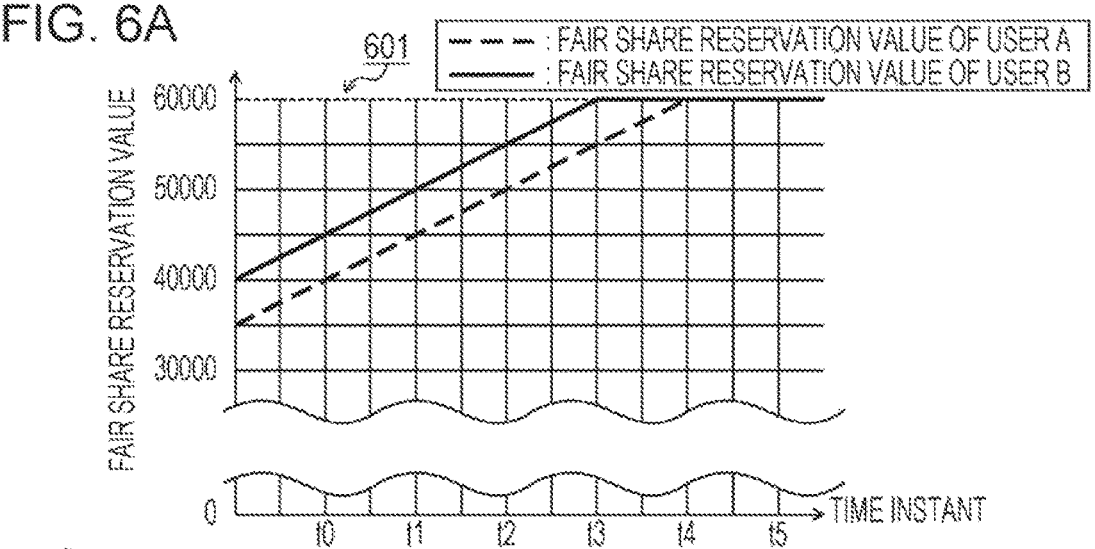
FIGS. 6A, 6B, and 6C are explanatory drawings (1) illustrating an update example of a fair share reservation value when resources at the future time instant are distributed according to the fair share reservation value.

FIG. 6A illustrates, as an update example of a fair share reservation value when resources at future time instants are allocated according to fair share reservation value, a graph 601 illustrating fair share reservation values of respective time instants when the job unallocated state continues. As illustrated in the graph 601, since at the current time instant t0, the fair share reservation value of the user A is 40000 and the fair share reservation value of the user B is 45000, the fair share reservation value of the user B is higher. Then, as illustrated in the graph 601, after the current time instant t0, the fair share reservation value of the user A recovers 5000, which is obtained by multiplying 50 by 100 computing nodes, every time the exclusive use time elapses and reaches a fair share initial value at the future time instant t4. Similarly, after the current time instant t0, the fair share reservation value of the user B recovers 5000, which is obtained by multiplying 50 by 100, every time the exclusive use time elapses and reaches a fair share initial value at the future time instant t3.

Since the fair share reservation value of the user B at the current time instant t0 is higher than the fair share reservation value of the user A, the management node 201 selects a job j3 of the user B as FIG. 5 (1) and judges whether or not the job j3 is allocatable to the current time instant t0. In this case, since the requested empty computing node is available at the current time instant t0, the management node 201 allocates the empty computing resource to the job j3.

Figure 6B:
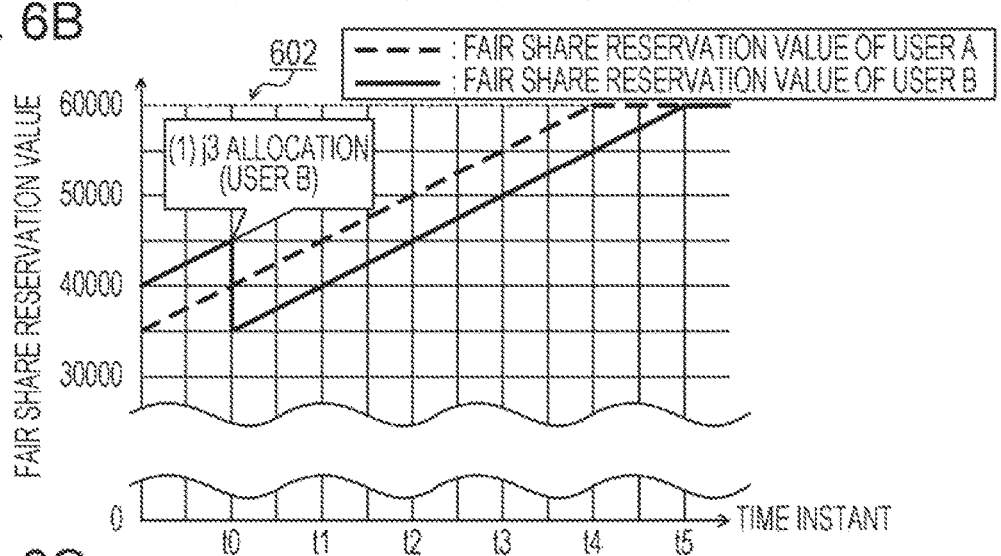

FIG. 6B illustrates a graph 602 illustrating a fair share reservation value of each time instant after allocation to the job j3 in FIG. 5 (1), as an update example of the fair share reservation value when resources at future time instants are distributed according to the fair share reservation value. As illustrated in the graph 602, since the management node 201 allocates the empty computing resource at the current time instant t0 to the job j3, the management node 201 subtracts 10000 from the fair share reservation value for all future time instants after the current time instant t0 of the user B that is an owner of the job j3. For example, the fair share use value of the user B at the current time instant t0 is 35000 which is obtained by subtracting 10000 from 45000. In addition, the fair share use value at the future time instant t1 of the user B is 40000 which is obtained by subtracting 10000 from 50000. The fair share reservation value of the user A remains as illustrated in the graph 601.

Then, at next job allocation, the management node 201 starts processing from the current time instant t0 again. For FIG. 5 (1), since the management node 201 makes allocation to the job j3, the fair share reservation value of the user A is 40000, the fair share reservation value of the user B is 35000, and the fair share reservation value of the user A is higher at the current time instant to. Thus, as FIG. 5 (2), the management node 201 selects a job j1 of the user A and judges whether the job j1 is allocatable to the current time instant t0. In this case, since the requested empty computing resource is available at the current time instant 50, the management node 201 allocates the empty computing resource to the job j1.

Figure 6C:
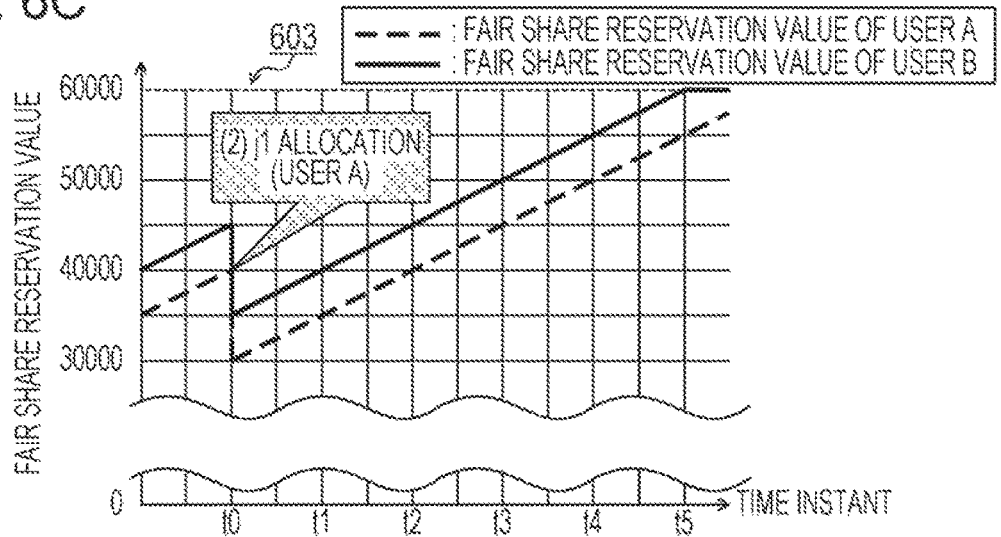

FIG. 6C illustrates a graph 603 illustrating the fair share reservation value of each time instant after allocation to the job j1 in FIG. 5 (2), as an update example of the fair share reservation value when resources at a future time instant are distributed according to the fair share reservation value. As illustrated in the graph 603, since the empty computing resource at the current time instant t0 is allocated to the job j1, the management node 201 subtracts 10000 from the fair share reservation value for all future time instants after the current time instant t0 of the user A that is an owner of the job j1. For example, the fair share use value of the user A at the current time instant t0 is 30000 which is obtained by subtracting 10000 from 40000. In addition, the fair share use value of the user A at the future time instant t1 is 35000 which is obtained by subtracting 10000 from 45000. The fair share reservation value of the user B remains as illustrated in the graph 602.

In allocation of a next job, the management node 201 starts processing from the current time instant t0 again. For FIG. 5 (2), since allocation to the job j1 is done, the fair share reservation value of the user A is 30000 and the fair share reservation value of the user B is 35000, the fair share reservation value of the user B is higher at the current time instant t0. Thus, the management node 201 selects a job j4 of the user B and judges whether or not the job j4 is allocatable to the current time instant t0. In this case, since there is no requested computing resource at the current time instant t0, the management node 201 judges that allocation is not possible.

Since no computing resource is allocated to the current time instant t0, the management node 201 refers to the fair share reservation value at the time instant t1 which is the next future time instant of the current time instant t0. At the future time instant t1, since the fair share reservation value of the user A is 35000 and the fair share reservation value of the user B is 40000, the fair share reservation value of the user B continues to be high. Thus, the management node 201 selects the job j4 of the user B and judges whether the job j4 is allocatable to the future time instant t1. In this case, since the requested empty computing resource is available at the future time instant t1, as FIG. 5 (3), the management node 201 allocates the empty computing resource to the job j4 as FIG. 5 (3).

Figure 7A:
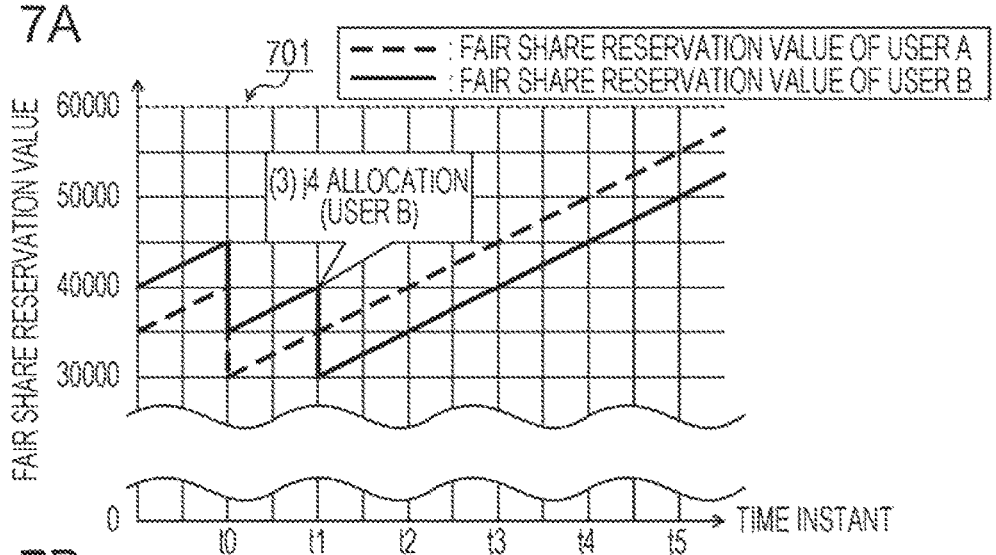
FIGS. 7A, 7B, and 7C are explanatory drawings (2) illustrating an update example of a fair share reservation value when resources at the future time instant are distributed according to the fair share reservation value.

FIG. 7A illustrates a graph 701 illustrating a fair share reservation value at each time instant after allocation to the job j4 in FIG. 5 (3), as an update example of the fair share reservation value when resources at future time instants are distributed according to a fair share reservation value. As illustrated in the graph 701, since the management node 201 allocates the empty computing resource at the time instant t1 to the job j4, the management node 201 subtracts 10000 from all future time instants of the user B, which is the owner of the job j4, after the future time instant t1. For example, the fair share use value of the user B at the future time instant t1 is 30000 which is obtained by subtracting 10000 from 40000. In addition, the fair share use value of the user B at the future time instant t2 is 35000 which is obtained by subtracting 10000 from 45000. The fair share reservation value of the user A remains as illustrated in the graph 603.

The management node 201 starts processing of next job allocation again from the current time instant t0. For FIG. 5 (3), since allocation at the future time instant t1 to the job j4 is done, the fair share reservation value at the current time instant t0 remains unchanged. Therefore, since the fair share reservation value of the user A is 30000 and the fair share reservation value of the user B is 35000, the fair share reservation value of the user B is higher. Thus, the management node 201 selects a job j7 of the user B and judges whether the job j7 is allocatable to the current time instant t0. In this case, since there is no requested empty computing resource at the current time instant t0, the management node 201 judges that the job j7 is not allocatable.

Since the job j7 is not allocatable to the current time instant t0, the management node 201 refers to a fair share reservation value of the next future time instant t1. At the future time instant t1, since the fair share reservation value of the user A is 35000 and the fair share reservation value of the user B is 30000, the fair share reservation value of the user A is higher. When the user that is given the priority changes from the user B to the user A, the management node 201 selects a job of the user A and checks whether the job is allocatable from the current time instant t0. Here, although till the future time t1, the fair share reservation value of the user B is higher than the fair share reservation value of the user A, the job of the user B is not allocatable. Thus, it is even useless to judge whether the job is allocatable at any time instant earlier than the future time instant t1. Then, the management node 201 stores the time instant when the user given the priority is switched in the user priority change time instant ctt, and may preferentially process the user A without judging on a fair share reservation value till the time instant ctt. This allows the management node 201 to omit useless processing and enable job allocation of the user A at the time instant ctt.

Since the current time instant t0 is earlier than the future time instant t1 which is ctt, the management node 201 preferentially selects the job j2 of the user A without judging a fair share reservation value, and judges whether the job j2 is allocatable to the current time instant to. In this case, since there is no requested empty computing resource at the current time instant t0, the management node 201 judges that the job j2 is not allocatable.

Then, since the job j2 is not allocatable to the current time instant t0, the management node 201 judges whether the job j2 is allocatable to the next future time instant t1. However, since the future time instant t1 is not earlier than the future time instant t1 which is ctt, the management node 201 judges a fair share reservation value. When the fair share reservation value at the future time instant t1 is referred, the fair share reservation value of the user A is 35000 and the fair share reservation value of the user B is 30000, the fair share reservation value of the user A is higher, and the user to be given priority remains unchanged. As a result of this, the management node 201 continues to give the priority to the user A to select a job j2, and judges whether the computing resource is allocatable to the future time instant t1. In this case, since a requested empty computing resource is available at the future time instant t1, the management node 201 allocates the empty computing resource to the job j2 as FIG. 5 (4).

Figure 7B:
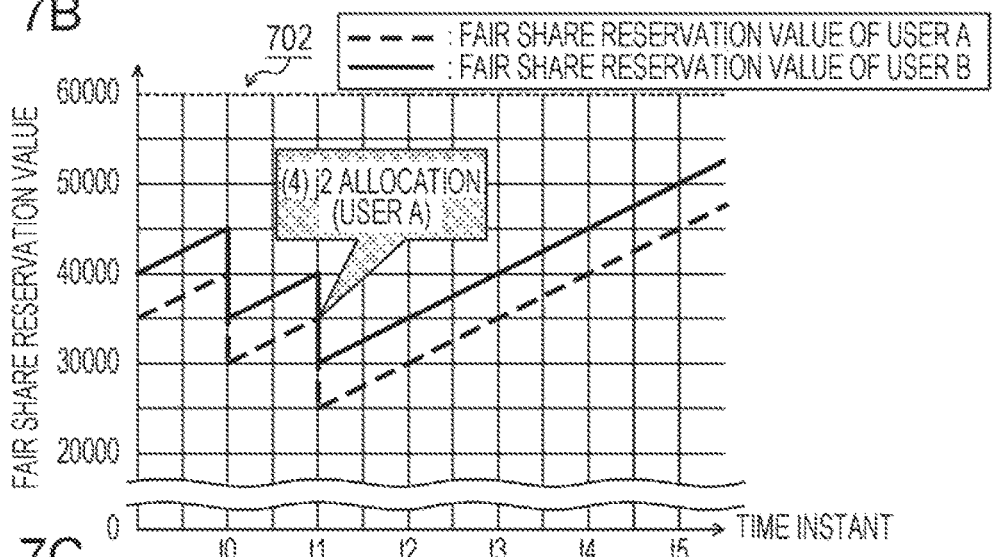

FIG. 7B illustrates a graph 702 illustrating a fair share reservation value at each time instant after allocation to the job j2 in FIG. 5 (4), as an update example of a fair share reservation value when resources at a future time instant are distributed according to the fair share reservation value. As illustrated in the graph 702, since the management node 201 allocates the empty computing resource at the time instant t1 to the job j2, the management node 201 subtracts 10000 from fair share reservation values of the user A, which is the owner of the job j2, for all future time instants after the future time instant t1. For example, the fair share use value of the user A at the future time instant t2 is 250000 which is obtained by subtracting 10000 from 35000. In addition, the fair share use value of the user A at the future time instant t2 is 30000 which is obtained by subtracting 10000 from 40000. The fair share reservation value of the user B remains as illustrated in the graph 701.

Also similarly in subsequent job allocation, the management node 201 starts processing at the current time instant t0, and sequentially allocates a job by referring to a fair share reservation value at each future time instant and switching a user to be given the priority.

Figure 7C:
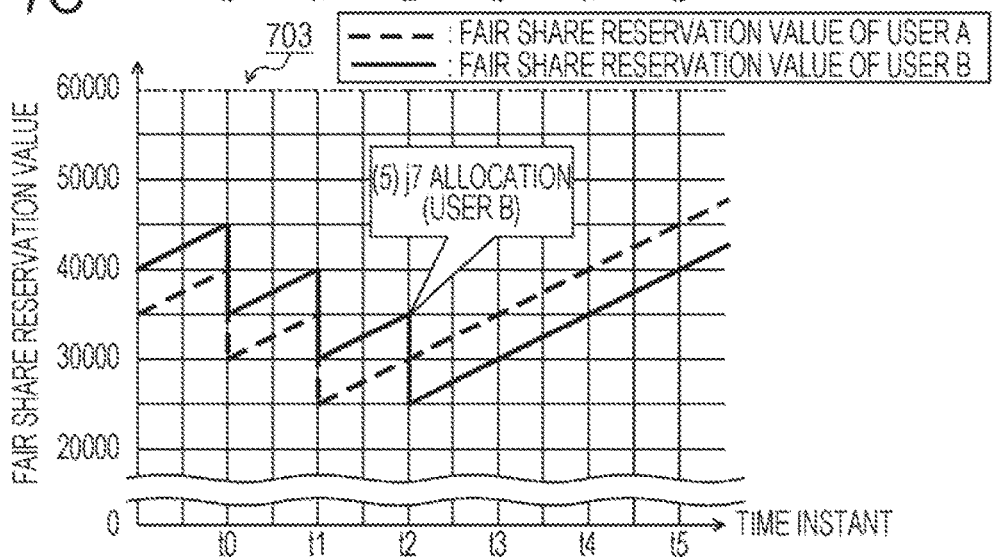
Figure 8A:
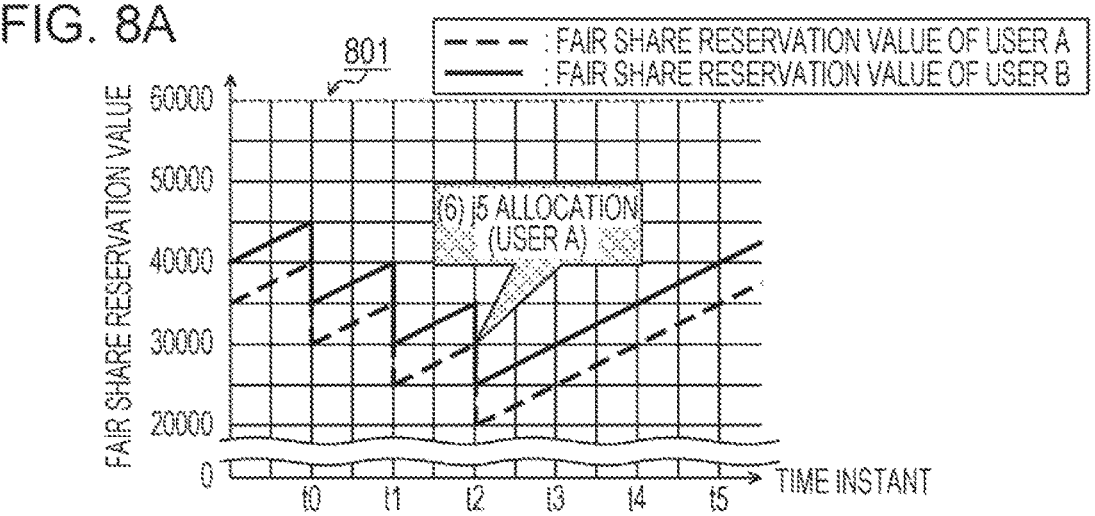
FIGS. 8A, 8B, and 8C are explanatory drawings (3) illustrating an update example of a fair share reservation value when resources at the future time instant are distributed according to the fair share reservation value.

Specifically, the management node 201 allocates an empty computing resource at the future time instant t2 to the job j7 of the user B and a job j5 of the user A, as FIG. 5 (5) and FIG. 5 (6). Then, FIG. 7C illustrates a graph 703 illustrating a fair share reservation value at each tie instant after allocation to the job j7 in FIG. 5 (5), as an update example of the fair share reservation value when resources at future time instants are distributed according to the fair share reservation value. In addition, FIG. 8A illustrates a graph 801 illustrating a fair share reservation value at each time instant after allocation to the job j5 in FIG. 5 (6), as an update example of the fair share reservation value when resources at future time instants are distributed according to the fair share reservation value.

Figure 8B:
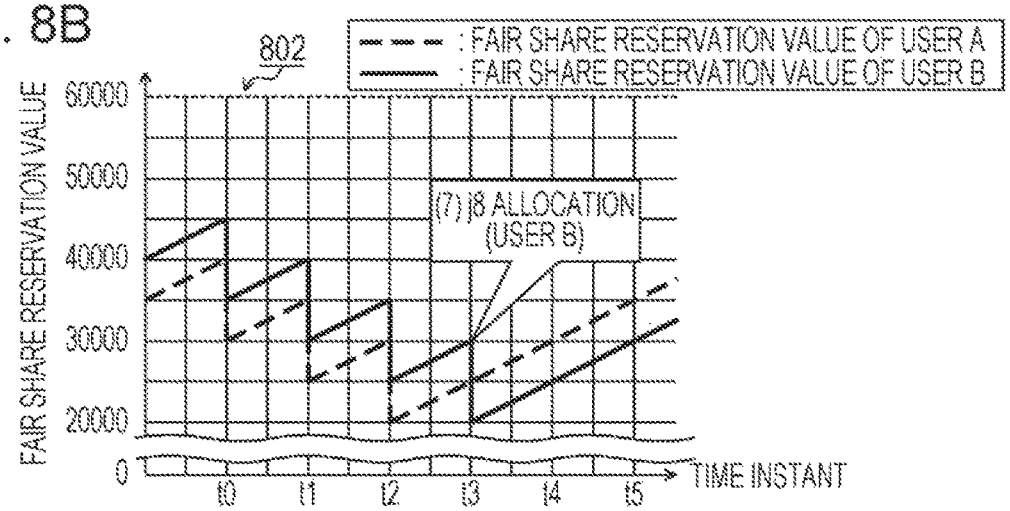
Figure 8C:
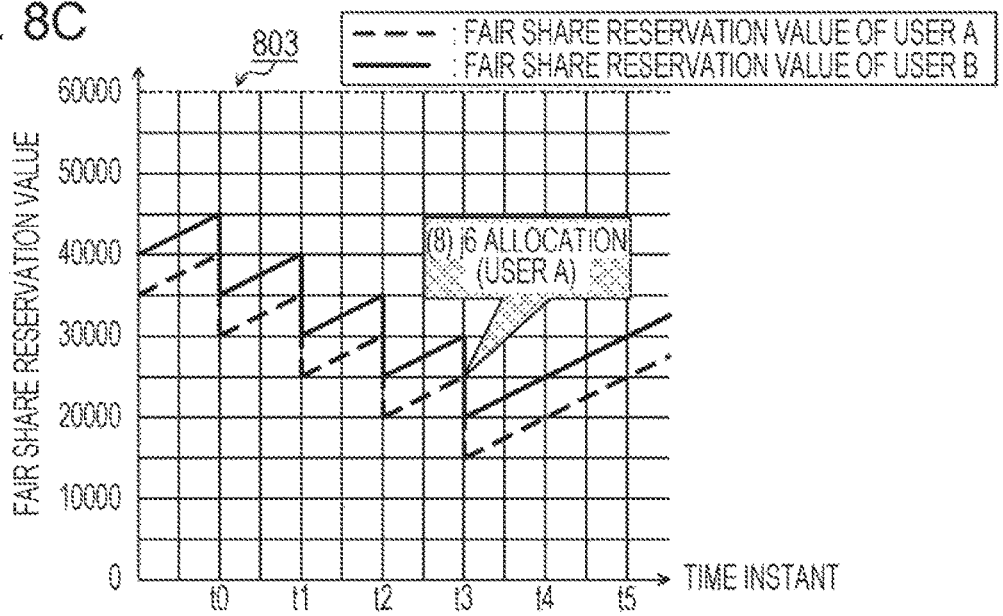

The management node 201 also allocates an empty computing resource at the future time instant t3 to a job j8 of the user B and a job j6 of the user A as FIG. 5 (7) and FIG. 5 (8). Then, FIG. 8B illustrates a graph 802 illustrating a fair share reservation value at each time instant after allocation to the job j8 in FIG. 5 (7), as an update example of the fair share reservation value when resources at future time instants are distributed according to the fair share reservation value. In addition, FIG. 8C illustrates a graph 803 illustrating a fair share reservation value at each time instant after allocation to the job j6 in FIG. 5 (8), as an update example of the fair share reservation value when resources at future time instants are distributed according to the fair share reservation value.

Figure 9A:
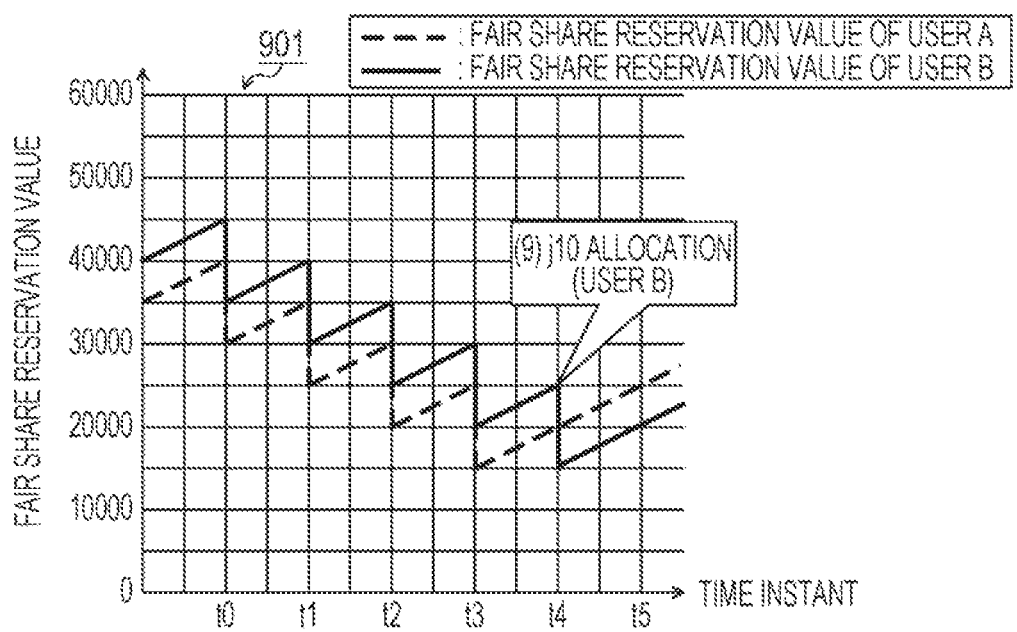
FIGS. 9A and 9B are explanatory drawings (4) illustrating an update example of a fair share reservation value when resources at the future time instant are distributed according to the fair share reservation value.
Figure 9B:
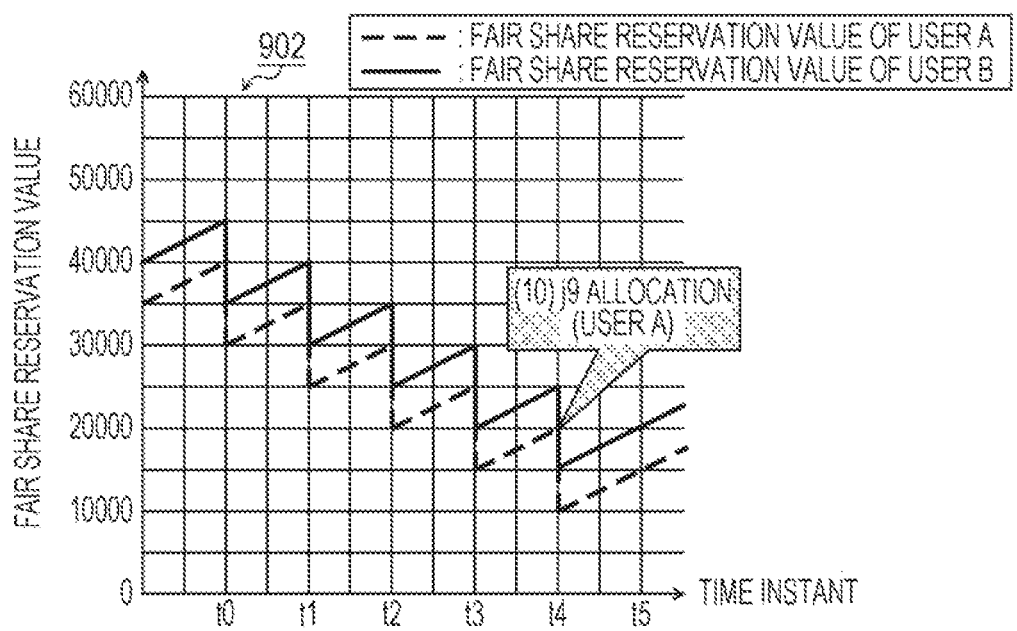

In addition, the management node 201 allocates an empty computing resource at a future time instant t4 to a job j10 of the user B and a job j9 of the user A as FIG. 5 (9) and FIG. 5 (10). Then, FIG. 9A illustrates a graph 901 illustrating a fair share reservation value at each time instant after allocation to the job j10 in FIG. 5 (9), as an update example of the fair share reservation value when resources at future time instants are distributed according to the fair share reservation value. In addition, FIG. 9B illustrates a graph 902 illustrating a fair share reservation value at each time instant after allocation to the job j9 in FIG. 5 (10), as an update example of the fair share reservation value when resources at future time instants are distributed according to the fair share reservation value.

As a result of the future allocation of the jobs j1 to j10, as illustrated in FIGS. 5 to 9B, it is seen that the jobs of the user A and the user B are equally allocated at each of the current time instant t0 to the future time instant t4. In this manner, the management node 201 may perform control to fairly distribute computing resources to reserved jobs to which future allocation is performed, as per a target.

FIG. 10 is an explanatory drawing illustrating a list of updates of fair share reservation values. FIG. 10 illustrates a table 1001 illustrating a list of update status of the fair share reservation values illustrated in FIGS. 5 to 9B. Specifically, the table 1001 lists fair share reservation values of the user A and the user B before job allocation and after FIGS. 5 (1) to (10) by the current time instant t0 and the future time instant t1 to t9.

Then, as a comparison of effects of resource distribution at future time instants according to a fair share reservation value, as described in FIGS. 5 to 10, FIG. 11 illustrates an example of a case in which resources at future time instants are distributed according to a fair share value.

Figure 11:
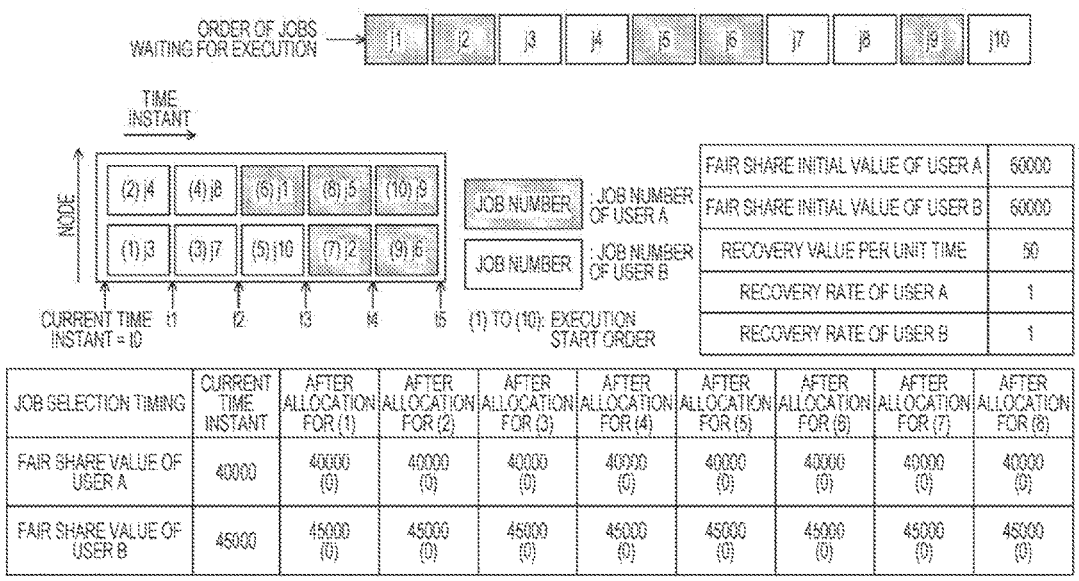
FIG. 11 is an explanatory drawing illustrating one example when resources at the future time instant are distributed according to the fair share reservation value.

FIG. 11 is an explanatory drawing illustrating one example when resources at the future time instant are distributed according to the fair share reservation value. In the example of FIG. 11, a device that allocates a computing resource is configured to perform a scheduling process to allocate a computing resource at the current time instant and at the future time instant to a job. In addition, in the example of FIG. 11, jobs waiting for execution are input in the ascending order of a job number. Then, the job input by the user A and the job input by the user B are same as FIGS. 5 to 10. In addition, the computing resource requested by each job, the fair share initial value, the fair share values of the users A, B at the current time instant t0, the recovery value per unit time, and the recovery rates of the users A, B are same as FIGS. 5 to 10. Since a ratio between the recovery rates of the user A and the user B is 1:1, a target is to fairly distribute computing resources.

In addition, in FIG. 11, the order of jobs to be allocated to the current time instant t0, the future time instant t1 to the future time instant t5, and the future time instant t5 are illustrated in (1) to (10) of FIG. 11.

Since the fair share value of the user B at the current time instant to is higher than the fair share value of the user A, the device that allocates a computing resource selects a job j3 of the user B as FIG. 11 (1), and judges whether the job j3 is allocatable to the current time instant t0. In this case, since a requested empty computing resource is available at the current time instant t0, the device that allocates a computing device allocates the empty computing resource to the job j3.

Here, as far as a reserved job to be allocated in the future including the current time instant is present, the device that allocates a computing resource continues to process future allocation one after another without waiting for a change of a fair share value due to starting of job execution. Therefore, after allocation to the job j3, the fair share value of the user A is 40000 and the fair share value of the user B remains unchanged from 45000. As a result of this, since the fair share value of the user B remains high, the device that allocates a computing resource selects a job j4 of the user B and allocates an empty computing resource at the current time instant t0 to the job j4.

At this point of time, computing resources at the current time instant t0 have been all allocated. However, since there remain some reserved jobs to which future allocation is performed, the device that allocates a computing resource continues the scheduling process. Next time an empty computing resource is generated is the future time instant t1 when execution of the job j3 and the job j4 is scheduled to end.

Since the fair share value after the job j4 is allocated similarly remains unchanged, the fair share value of the user A is 40000 and the fair share value of the user B is 45000. As a result of this, since the fair share value of the user B remains high, as FIG. 11 (3), the device that allocates a computing resource selects a job j7 of the user B and allocates an empty computing resource at the future time instant t1 to the job j7. Since the fair share value after the job j7 is allocated similarly remains unchanged, as FIG. 11 (4), the device that allocates a computing resource selects a job j8 of the user B and allocates an empty computing resource at the future time instant t1 to the job j8.

At this point of time, computing resources at the future time instant t1 have been all allocated. However, since there remain some reserved jobs to which future allocation is performed, the device that allocates a computing resource continues the scheduling process. Next time an empty computing resource is generated is the future time instant t2 when execution of the job j7 and the job j8 is scheduled to end.

Since the fair share value after the job j8 is allocated similarly remains unchanged, as FIG. 11 (5), the device that allocates a computing resource selects a job j10 of the user B and allocates an empty computing resource at the future time instant t2 to the job j10. Since the fair share value after the job j10 is allocated similarly remains unchanged, the fair share value of the user B remains high. However, since a remaining reserved job to which future allocation is performed is only a job of the user A, the device that allocates a computing resource selects a job j1 of the user A and allocates an empty computing resource at the future time instant t2 to the job j1 as FIG. 11(6).

Subsequently, the device that allocates a computing resource allocates a computing resource at the future time instant t3 or the future time instant t4 to a job of the user A that similarly remains. Specifically, as FIGS. 11 (7) and (8), the device that allocates a computing resource allocates an empty computing resource at the future time instant t3 to a job j2 and a job j5 of the user A. In addition, as FIGS. 11 (9) and (10), the device that allocates a computing resource allocates an empty computing resource at the future time instant t4 to a job j6 and a job j9 of the user A.

Turning to a job allocation result in FIG. 11, the device that allocates a computing resource first reserves future allocation to all jobs of the user B, and then reserves future allocation to all jobs of the user A. In this manner, when resources at a future time instant are distributed according to a fair share value, control of fair distribution of computing resources may not be performed.

Next, with reference to FIGS. 12 to 21, a flowchart is illustrated in which a fair share reservation value control process is performed by the management node 201 to distribute resources at the future time instant according to a fair share reservation value, as illustrated in FIGS. 4 to 10. In the flowchart illustrated in FIGS. 12 to 21, for simplicity of the description, initial setting to perform operations illustrated in FIGS. 5 to 9B is performed.

Figure 12:
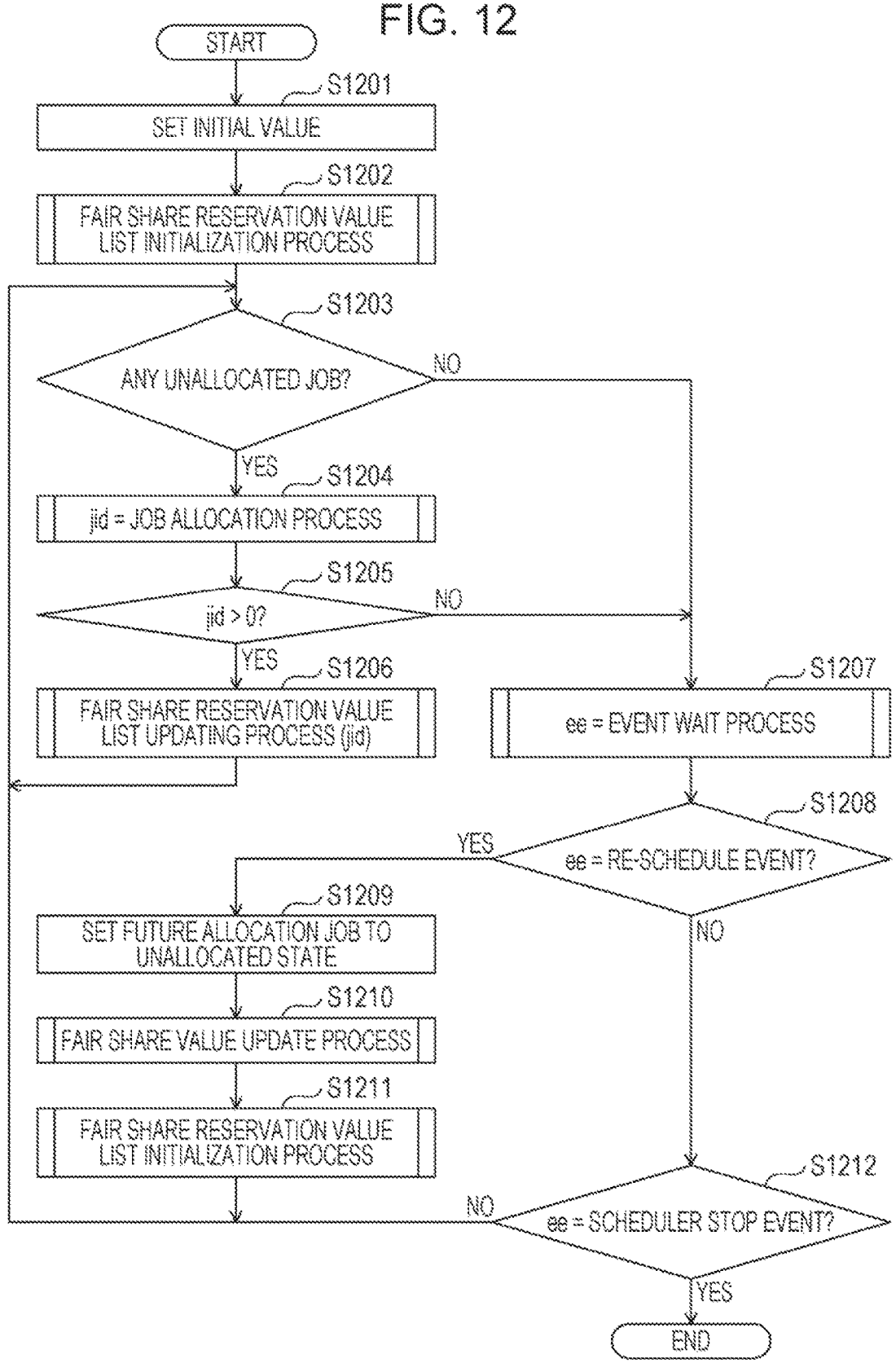
FIG. 12 is a flowchart illustrating one example of a fair share reservation value control process procedure.

FIG. 12 is a flowchart illustrating one example of fair share reservation value control process procedure. The fair share reservation value control process is a process to control a fair share reservation value.

The management node 201 sets an initial value (step S1201). Specifically, the management node 201 sets both of fair share initial values of the users A, B to 60000, as an initial value. The management node 201 also sets a recovery value per unit time to 50 as an initial value. The management node 201 also sets a user recovery rate of both users A, B to 1, as an initial value. The management node 201 also makes the number of empty computing nodes the number of all computing nodes, as an initial value. The management node 201 also sets fair share value update time to the current time instant, as an initial value.

In addition, the management node 201 sets fair share reservation value interval to 100. Here, after the current time instant, the interval is a specified second interval from 0 (Jan. 1, 1970 00:00:00) of the coordinated universal time (CUT). For example, when the current time instant is 00:01:10 and a fair share reservation value interval is 100 [seconds], a time instant set in each fair share reservation value list is as follows:

Fair share reservation value list [0].tt is 00:01:10 (Current time instant);

Fair share reservation value list [1].tt is 00:01:40 (100 seconds);

Fair share reservation value list [2].tt is 00:03:20 (200 seconds); and

Fair share reservation value list [3].tt is 00:05:00 (300 seconds).

In addition, the management node 201 sets fs_num to 100, as an initial value. Here, fs_num is a number of arrays in the fair share reservation value list. Then, the management node 201 may allocate jobs till a future time instant which is obtained by multiplying fs_num by fair share reservation value interval. Then, the management node 201 secures a storage area for the fair share reservation value list [fs_num] on the RAM 303, as an initial value. This allows the management node 201 to secure a storage area from the fair share reservation value list [0] to [fs_num−1].

In addition, the management node 201 sets a user A fair share initial value to the user A fair share value, as an initial value. Similarly, the management node 201 sets a user B fair share initial value to the user B fair share value, as an initial value.

Then, the management node 201 performs a fair share reservation value list initialization process (step S1202). The fair share reservation value list initialization process is described in FIGS. 17 and 18. Then, the management node 201 judges whether there is any unallocated job (step S1203). If there is any unallocated job (step S1203: Yes), the management node 201 performs a job allocation process (step S1204). Then, the management node 201 sets a return value of the job allocation process to jid. The job allocation process is described in FIGS. 14 and 15.

Then, the management node 201 judges whether or not the jid is larger than 0 (step S1205). When the jid is larger than 0 (step S1205: Yes), the management node 201 performs the fair share reservation list update process with the id as an augment (step S1206). The fair share reservation value list update process is described in FIG. 19. Then, the management node 201 proceeds to processing in step S1203.

Figure 20:
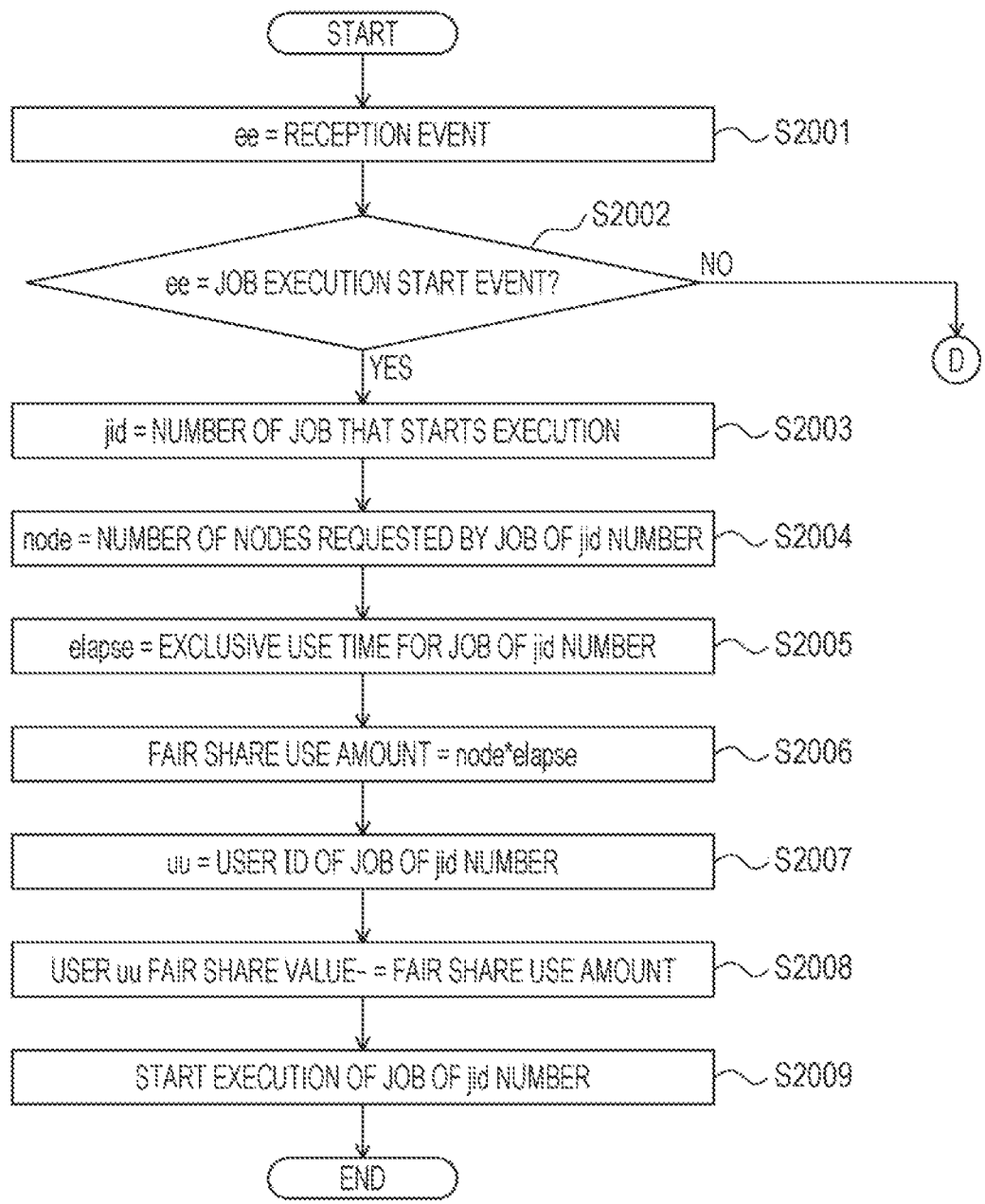
FIG. 20 is a flowchart (1) illustrating one example of an event wait process procedure.
Figure 21:
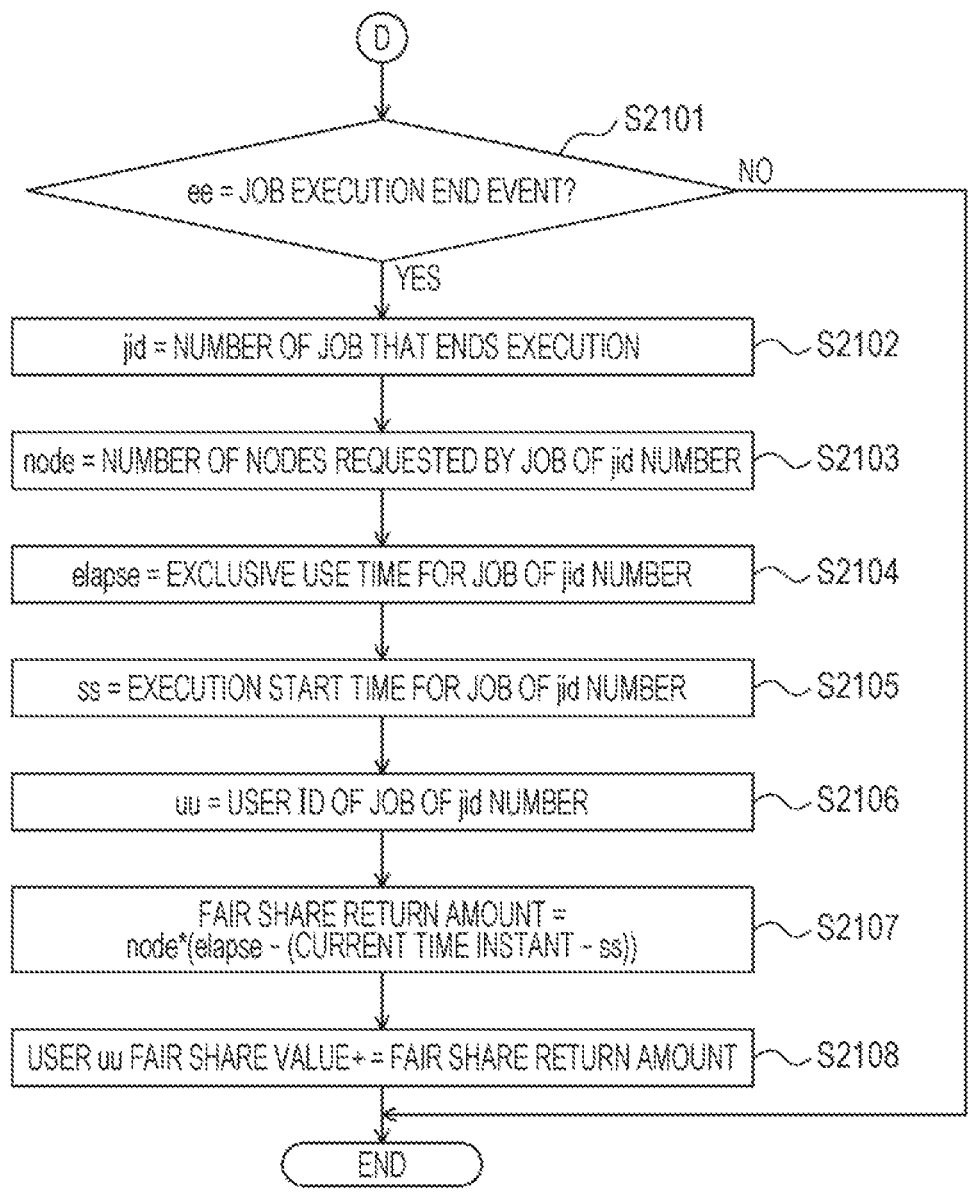
FIG. 21 is a flowchart (2) illustrating one example of the event wait process procedure.

On the other hand, when there is no unallocated job (step S1203: No) or when the jid is 0 or less (step S1205: No), the management node 201 executes an event wait process (step S1207). Then, the management node 201 sets a return value of the event waiting process to ee. The event wait process is illustrated in FIGS. 20 and 21. Then, the management node 201 judges whether or not ee is a reschedule event (step S1208).

Figure 13:
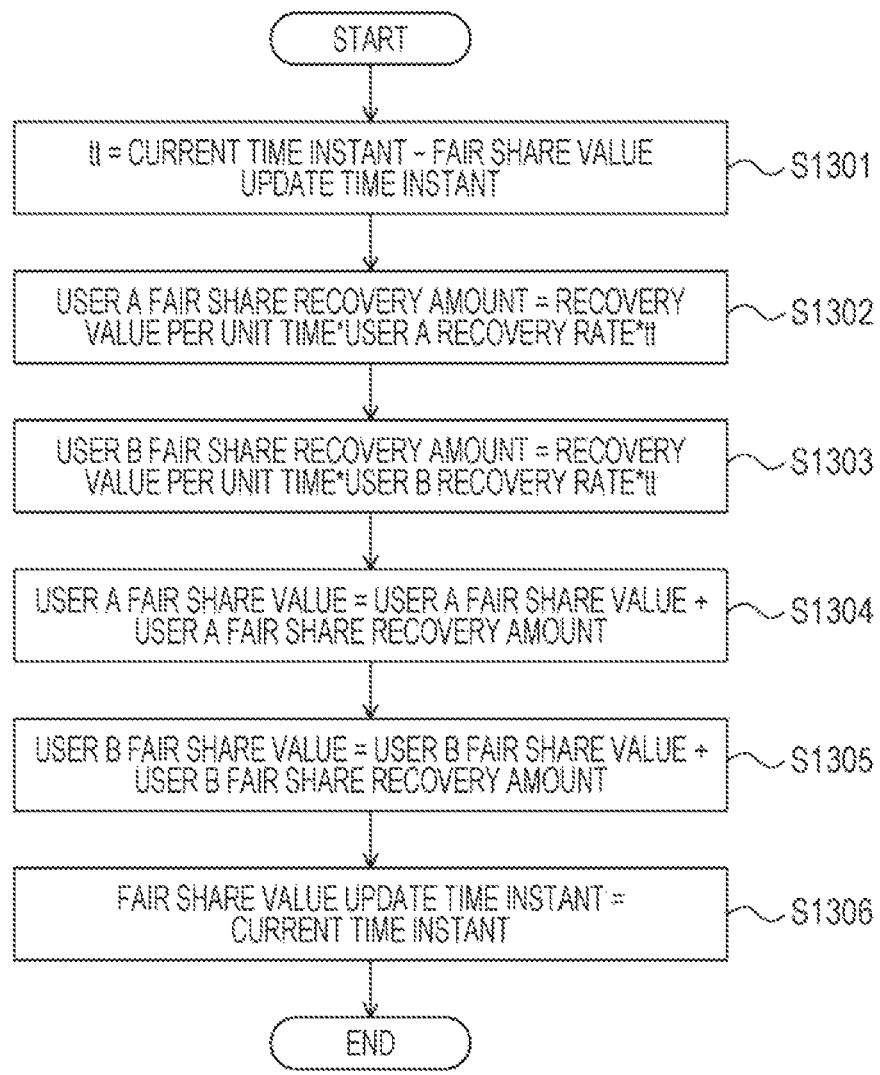
FIG. 13 is a flowchart illustrating one example of a fair share value update process procedure.

When ee is a reschedule event (step S1208: Yes), the management node 201 sets a future allocation job to unallocated state (step S1209). Then, the management node 201 performs the fair share value update process (step S1210). The fair share value update process is illustrated in FIG. 13. Then, the management node 201 performs the fare share reservation value list initialization process (step S1211). Then, the management node 201 proceeds to processing of step S1203.

On the other hand, when ee is not a reschedule event (step S1208: No), the management node 201 judges whether or not ee is a scheduler stop event (step S1212). When ee is not a scheduler stop event (step S1212: No), the management node 201 proceeds to processing of step S1203. On the other hand, when ee is a scheduler stop event (step S1212: Yes), the management node 201 finishes the fair share reservation value control process. BY performing the fair share reservation value control process, the management node 201 may control a fair share reservation value to allocate a computing resource at a future time instant.

FIG. 13 is a flowchart illustrating one example of fair share value update process procedure. The fair share value update process is a process to update a fair share value.

The management node 201 sets tt to a time obtained by subtracting faire share update time from the current time instant (step S1301). Then, the management node 201 sets the user A fair share recovery amount to a product of the recovery value per unit time, the user A recovery rate, and tt (step S1302). In addition, the management node 201 sets the user B fair share recovery amount to a product of the recovery value per unit time, the user B recovery rate, and tt (step S1303). Then, the management node 201 sets the user A fair share value to a sum of the user A fair share value and the user A fair share recovery amount (step S1304). Then, the management node 201 sets the user B fair share value to a sum of the user B fair share value and the user B fair share recovery amount (step S1305). Then, the management node sets the fair share value update time to the current time (step S1306).

After processing of step S1306, the management node 201 finishes the fair share value update process. The management node 201 may recover a fair share value due to time elapse, by performing the fair share value update process.

Figure 14:
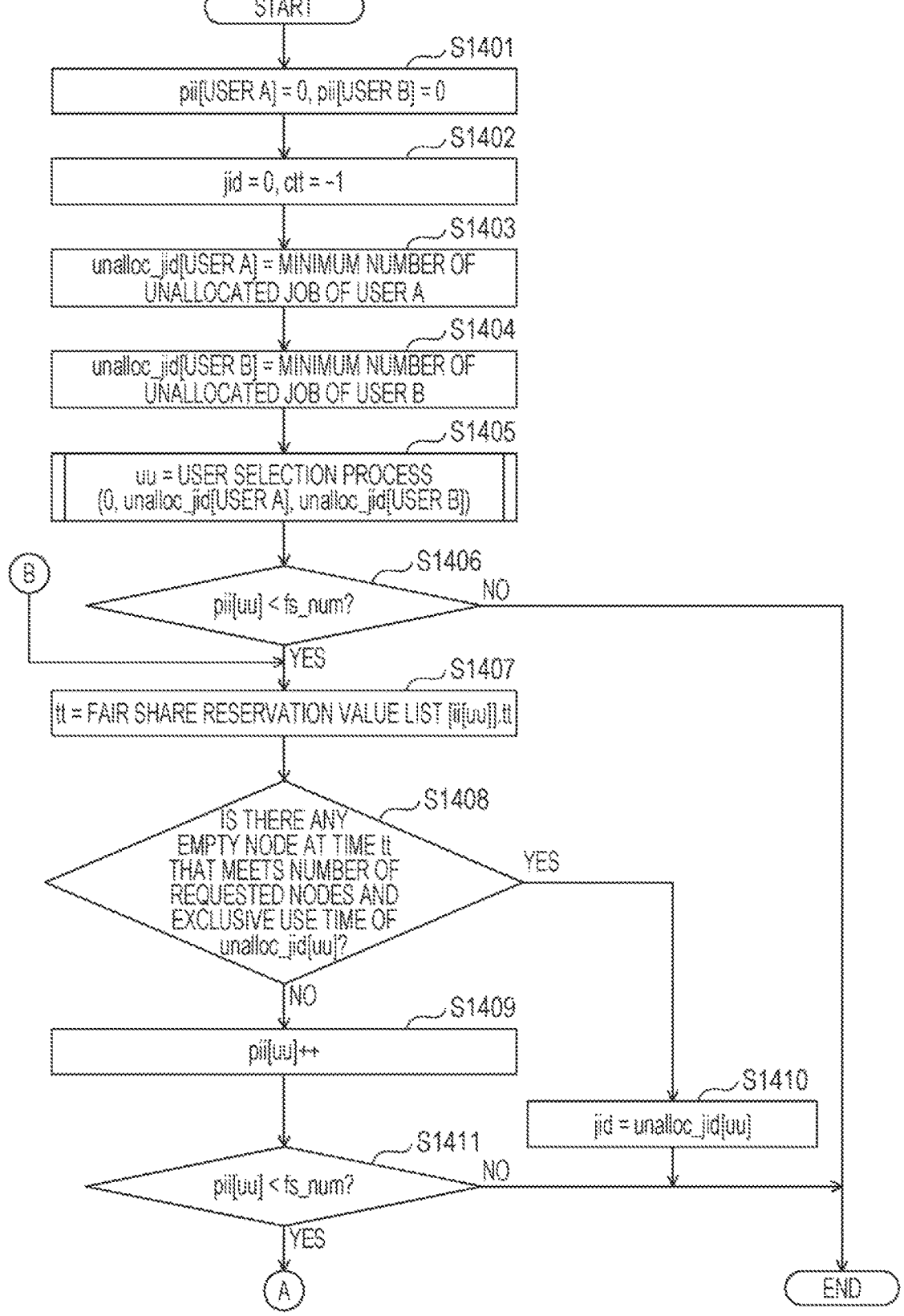
FIG. 14 is a flowchart (1) illustrating one example of job allocation process procedure.
Figure 15:
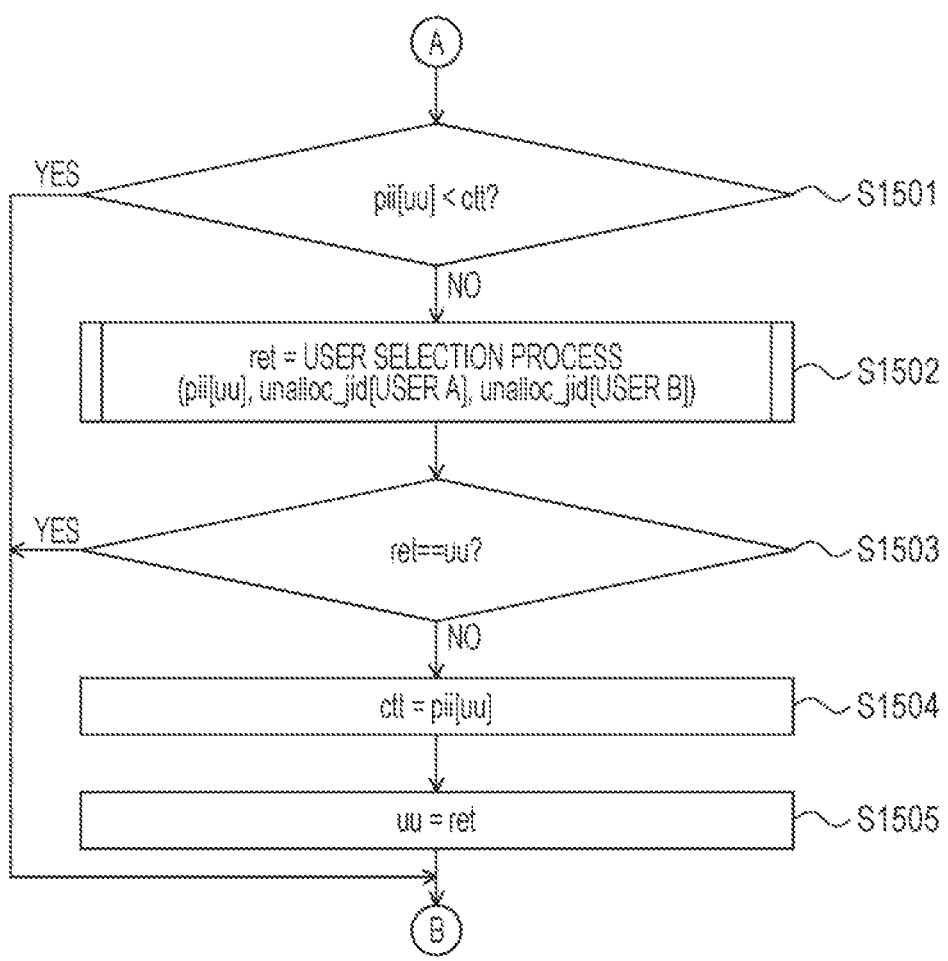
FIG. 15 is a flowchart (2) illustrating one example of the job allocation process procedure.

FIG. 14 is a flowchart (1) illustrating one example of a job allocation process procedure. In addition, FIG. 15 is a flowchart (2) illustrating one example of a job allocation process procedure. The job allocation process is a process to allocate a computing resource to a job.

The management node 201 not only sets 0 to pii [user A] and 0 to pii [user B] (step S1401). Here, pii is an array to store an index to be processed for each user in the fair share reservation value list. The management node 201 processes an index of 0, which is the current time instant, in processing of step S1401. Then, the management node 201 not only sets 0 to the jid but also sets −1 to ctt (step S1402). In the jid, a number of a job to be allocated is stored. In addition, if there is no job to be allocated, 0 is stored in the jid. ctt is the user priority change time described in FIG. 5 (3).

Then, the management node 201 sets a minimum number of unallocated job of the user A to unalloc_jid [user A] (step S1403). The management node 201 also sets a minimum number of unallocated job of the user B to unalloc_jid [user B] (step S1404). Here, unalloc_jid is an array to store a job number that is an allocation candidate for each user.

Then, the management node 201 performs a user selection process with a first augment as 0, a second augment as a value of unalloc_jid [user A], and a third augment as a value of unalloc_jid [user B] (step S1405). Then, the management node 201 sets a return value of the user selection process to uu. The user selection process is described in FIG. 16.

Then, the management node 201 judges whether or not pii[uu] is smaller than fs_num (step S1406). When pii[uu] is smaller than fs_num (step S1406: Yes), the management node 201 sets a value of the fair share reservation list [ii[uu]].tt to tt (step S1407). Then, the management node 201 judges whether or not an empty computing node that satisfies the number of requested computing nodes of unalloc_jid [uu] and the empty computing node that meets exclusive use time (step S1408).

When there is no empty computing node that meets the exclusive use time at the time instant tt (step S1408: No), the management node 201 increments pii[uu] (step S1409). In this manner, if a job of the user uu having higher priority is not allocated, the management node 201 may increment pii[uu] and thereby omit a useless process to judge again that the job of the user uu is not allocated. On the other hand, when an empty computing node that meets the exclusive use time is present at the time instant tt (step S1408: Yes), the management node 201 sets a value of unalloc_jid[uu] to the jid (step S1410).

After processing of step S1409 ends, the management node 201 judges whether or not pii[uu] is smaller than fs_num (step 1411). After processing of step S1410, or when pii[uu] is equal to or larger than fs_num (step S1406: No, step S1411: No), the management node 201 finishes the job allocation process. Here, the management node 201 outputs a value of the jid as a return value of the job allocation process.

On the other hand, when pii[uu] is smaller than fs_num (step S1411: Yes), the management node 201 judges whether or not pii[uu] is smaller than ctt (step S1501). When pii[uu] is smaller than ctt (step S1501: Yes), the user having higher priority is earlier than the switched time ctt and does not switch from the user having higher priority, the management node 201 proceeds to processing of the step S1407.

When pii[uu] is equal to or larger than ctt (step S1501: No), the management node 201 performs the user selection process with a first augment as pii[uu], a second augment as unalloc_jid [user A], and a third augment as unalloc_jid [user B] (step S1502). Then, the management node 201 sets a return value of the user selection process to ret. Then, the management node 201 judges whether or not the value of ret and the value of uu are same (step S1503). When the value of ret and the value of uu are same (step S1503: Yes), the management node 201 proceeds to processing of step S1407.

On the other hand, when the value of ret and the value of uu are not same (step S1503: No), the management node 201 sets the value of pii[uu] to ctt in order to indicate that the user having higher priority has switched (step S1504). Then, the management node 201 sets the value of ret to uu (step S1505). Then, the management node 201 proceeds to processing of step S1407. The management node 201 may allocate a computing resource at a future time instant by performing the job allocation process.

Figure 16:
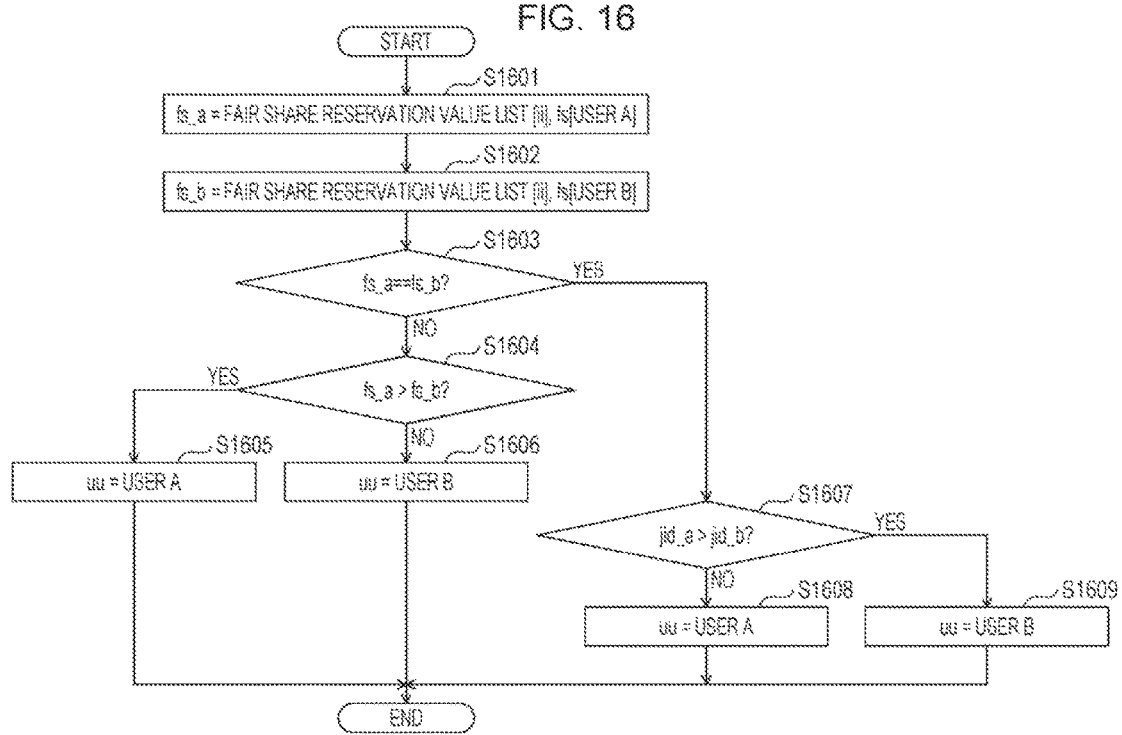
FIG. 16 is a flowchart illustrating one example of a user selection process procedure.

FIG. 16 is a flow chart illustrating one example of the user selection process procedure. The user selection process is a process to select a user to whom a computing resource is preferentially allocated. Here, the user selection process receives an index ii of the time instant to be processed as a first augment, a job number jid_a of the user A as a second augment, and a job number jid_b of the user B as a third augment from a calling function.

The management node 201 sets the fair share reservation value list [ii].fs[user A] to fs_a (step S1601). The management node 201 also sets the fair share reservation value list [ii].fs[user B] to fs_b (step S1602). The management node 201 judges whether or not fs_a and fs_b are same (step S1603). When fs_a and fs_b are different (step S1603: No), the management node 201 judges whether or not fs_a is larger than fs_b (step S1604). When fs_a is larger than fs_b (step 1604: Yes), the management node 201 sets the user A to uu (step S1605).

On the other hand, when fs_a is equal to or less than fs_b (step S1604: No), processing of step S1603 is No. Specifically, when fs_a is less than fs_b, the management node 201 sets the user B to uu (step S1606).

On the other hand, when fs_a and fs_b are same (step S1603: Yes), the management node 201 judges whether jid_a is larger than jid_b (step S1607). When jid_a is equal to or less than jid_b (step S1607: No), the management node 201 sets the user A to uu (step S1608). On the other hand, when jid_a is larger than jid_b (step S1607: Yes), the management node 201 sets uu to the user B (step S1609).

After any processing of step S1605, step S1606, step 1608, or step S1609 ends, the management node 201 finishes the user selection process. Here, the management node 201 outputs uu as a return value of the user selection process. By performing the user selection process, the management node 201 may use a fair share reservation value calculated from a recovery rate in accordance of resource distribution and select a user having higher priority.

Figure 17:
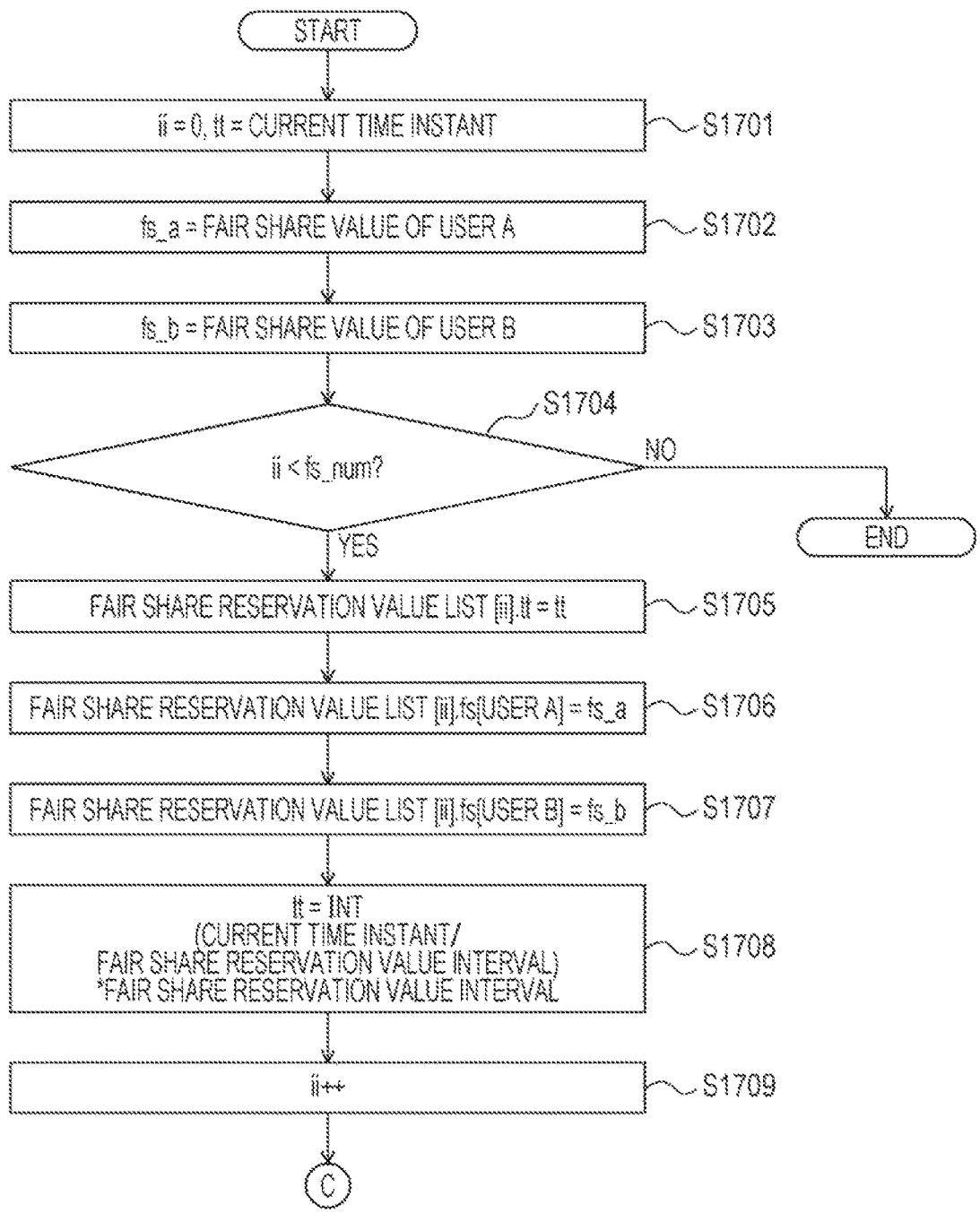
FIG. 17 is a flowchart (1) illustrating one example of a fair share reservation value list initialization process procedure.
Figure 18:
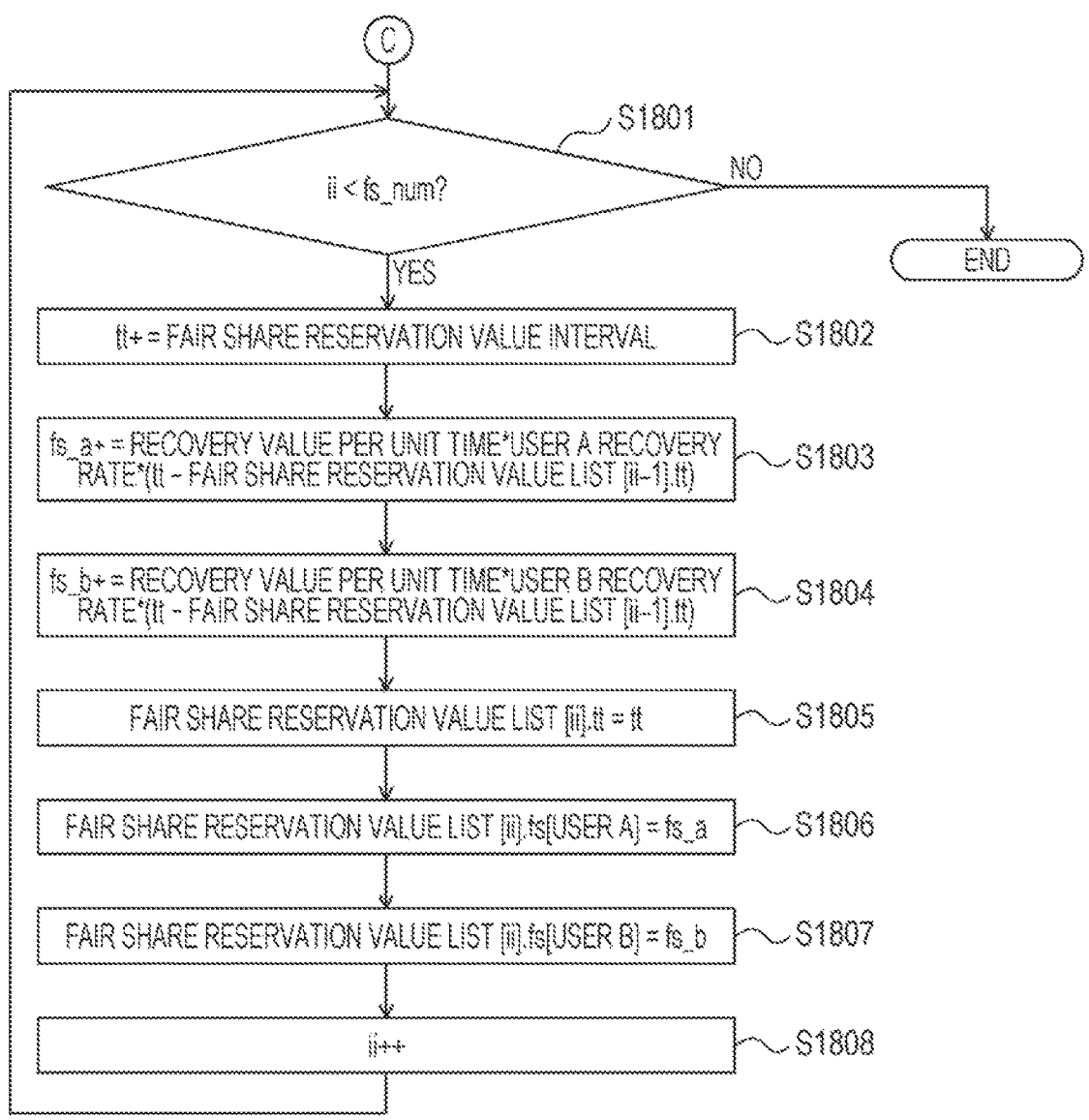
FIG. 18 is a flowchart (2) illustrating one example of the fair share reservation value list initialization process procedure.

FIG. 17 is a flowchart (1) illustrating one example of fair share reservation value list initialization process procedure. FIG. 18 is a flowchart (2) illustrating one example of fair share reservation value list initialization process procedure. The fare share reservation value list initialization process is a process to initialize a fair share reservation value list.

The management node 201 sets 0 to ii and the current time instant tt (step S1701). Here, ii in the fair share reservation value list initialization process is a variable to store a value of an index subject to processing of the fair share reservation value list.

Then, the management node 201 sets a fair share value of the user A to fs_a (step S1702). The management node 201 also sets a fair share value of the user B to fs_b (step S1703).

Then, the management node 201 judges whether or not ii is smaller than fs_num (step S1704). When ii is equal to or larger than fs_num (step S1704: No), the management node 201 finishes the fair share reservation value list initialization process. On the other hand, when ii is equal to or smaller than fs_num (step S1704: Yes), the management node 201 sets a value of tt to the fair share reservation value list [ii].tt (step S1705). Then, the management node 201 sets a value of fs_a to the fair share reservation value list [ii].fs [userA] (step S1706). In addition, the management node 201 sets a value of fs_b to the fair share reservation value list [ii].fs [userB] (step S1707).

Then, the management node 201 sets a value, which is a product of "INT (the current time instant divided by the fair share reservation value interval) and the fair share reservation value interval", to tt (step S1708). Here, the INT ( ) is a function to truncate any decimal fraction of a numeric value of an augment. Then, the management node 201 increments ii (step S1709).

Then, the management node 201 judges whether or not ii is smaller than fs_num (step S1801). When ii is equal to or larger than fs_num (step S1801: No), the management node 201 finishes the fair share reservation value list initialization process. On the other hand, when ii is smaller than fs_num (step S1801: Yes), the management node 201 adds a value of the fair share reservation value interval to tt (step S1802). Then, the management node 201 adds a value of a product of "the recovery value per unit time, the user A recovery rate, and (tt minus fair share reservation value list [ii−1].tt)" to fs_a (step S1803). The management node 201 also adds a value of a product of "the recovery value per unit time, the user B recovery rate, and (tt minus fair share reservation value list [ii−1].tt)" to fs_b (step S1804).

Then, the management node 201 sets a value of tt to the fair share reservation value list [ii].tt (step S1805). Then, the management node 201 sets a value of fs_a to the fair share reservation value list [ii].fs [user A] (step S1806). The management node 201 also sets a value of fs_b to the fair share reservation value list [ii].fs [user B] (step S1807). Then, the management node 201 increments ii (step S1808). Then, the management node 201 proceeds to processing of step S1801. The management node 201 may initialize the fair share reservation value list by performing the fair share reservation value list initialization process.

Figure 19:
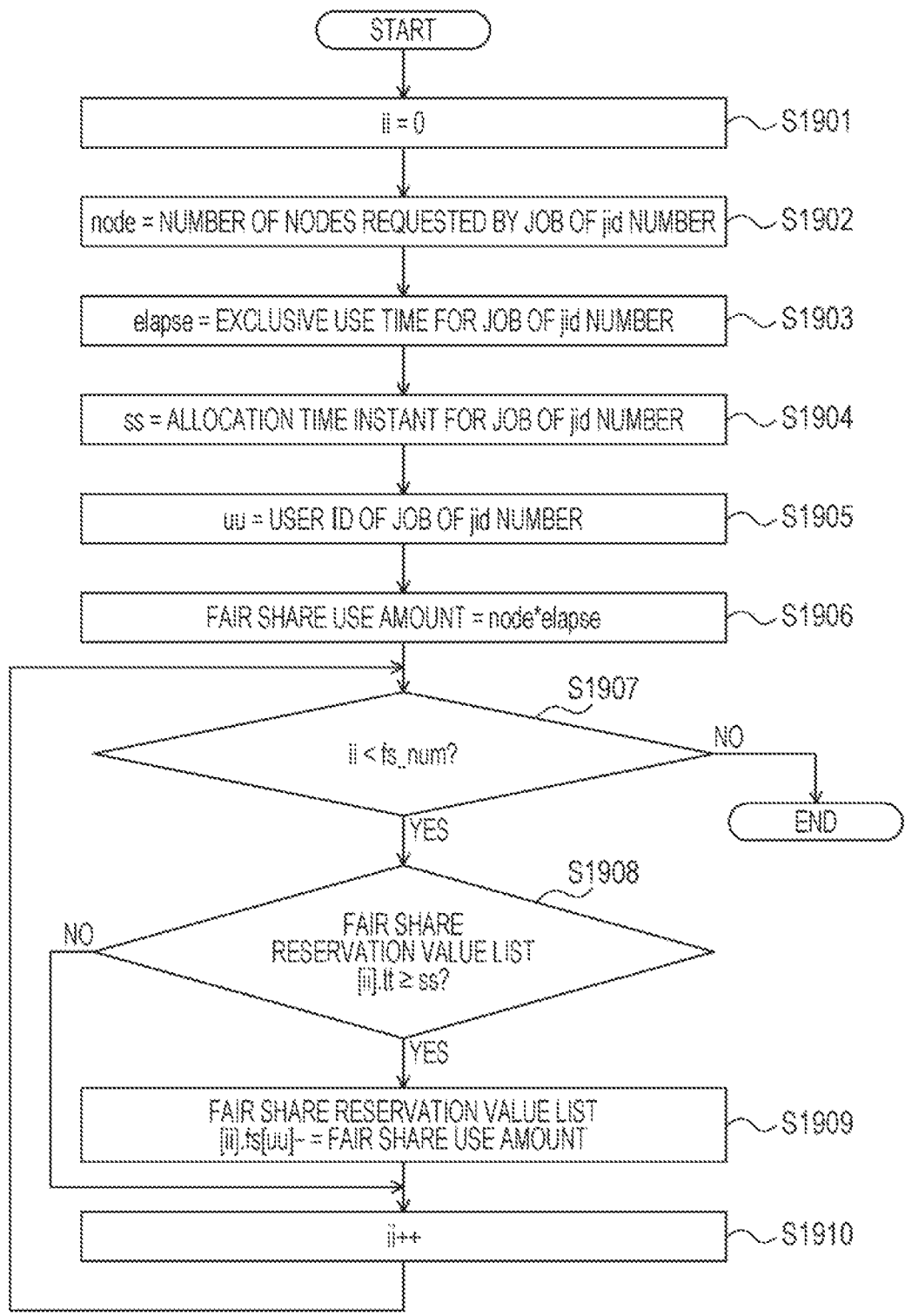
FIG. 19 is a flowchart illustrating one example of a fair share reservation value list update process procedure.

FIG. 19 is a flowchart illustrating one example of the fair share reservation value list update process procedure. The fair share reservation value list update process is a process to update the fair share reservation value list. Here, the fair share reservation value list update process receives a job number jid to be processed as an augment from a calling function.

The management node 201 sets 0 to ii (step S1901). Then, the management node 201 sets the number of requested computing nodes of a job of the jid number to node (step S1902). Then, the management node 201 sets exclusive use time of the job of the jid number to elapse (step S1903). Then, the management node 201 sets ss to an allocation time instant of the job of the jid number (step S1904). Then, the management node 201 sets a user ID of the job of the jid number to uu (step S1905). Then, the management node 201 sets a value of a product of node and elapse to fair share use amount (step 1906).

Then, the management node 201 judges whether or not ii is smaller than fs_num (step S1907). When ii is smaller than fs_num (Yes: step S1907), the management node 201 judges whether or not the fair share reservation value list [ii].tt is equal to or larger than ss (step S1908). When the fair share reservation value list [ii].tt is equal to or larger than ss (step S1908: Yes), the management node 201 reduces the fair share use amount from the fair share reservation value list [ii].fs[uu] (step S1909).

After processing of step S1909 ends, or when the fair share reservation value list [ii].tt is less than ss (step S1908: No), the management node 201 increments ii (step S1910). Then, the management node 201 proceeds to processing of step S1907. When ii is equal to or larger than fs_num (step S1907: No), the management node 201 finishes the fair share reservation value list update process. The management node 201 may subtract the fair share reservation value after the future time instant ss of the fair share reservation value list, by performing the fair share reservation value list update process.

FIG. 20 is a flowchart (1) illustrating one example of event wait process procedure. FIG. 21 is a flowchart (2) illustrating one example of the event wait process procedure. The event wait process is to perform a process depending on a received event.

The management node 201 sets a reception event to ee (step S2001). Here, the reception event is any of a new job input event, a job execution start event, a job execution end event, a rescheduling event, or a scheduler stop event.

Then, the management node 201 judges whether or not ee is a job execution start event (step S2002). When ee is a job execution start event (step S2002: Yes), the management node 201 sets a number of job to start execution to a jid (step S2003). Then, the management node 201 sets the number of computing resources requested by the job of the jid number in node (Step S2004). Furthermore, the management node 201 sets the exclusive use time for the job of the jid number to elapse (step S2005). Then, the management node 201 sets a value of a product of node and elapse to the fair share use amount (step S2006).

Then, the management node 201 sets a user ID of the job of the jid number to uu (step S2007). Then, the management node 201 subtracts the fair share use amount from the user uu fair share value (step S2008). Then, the management node 201 causes the computing node to which the job of the jid number is allocated to start execution of the job of the jid number (step S2009). Then, the management node 201 finishes the event wait process.

On the other hand, when ee is not the job execution start event (step S2002: No), the management node 201 judges whether or not ee is the event execution end event (step S2101). When ee is the job execution end event (step S2101: Yes), the management node 201 sets the number of the job that finishes execution to the jid (step S2102). Then, the management node 201 sets the number of computing nodes requested by the job of the jid number to node (step S2103). Then, the management node 201 sets the exclusive use time of the job of the jid number to elapse (step S2104). Then, the management node 201 sets the execution start time of the job of the jid number to ss (step S2105). Then, the management node sets the user ID of the job of the jid number to uu (step S2106). Then, the management node 201 sets a value of a product of "node and (elapse minus (current time minus ss))" to a fair share return amount (step S2107). Then, the management node 201 adds the fair share return amount to the user uu fair share value (step S2108).

After processing of step S2108 ends, or when ee is not the job execution end event (step S2101: No), the management node 201 finishes the event wait process. Here, the management node 201 outputs ee as a return value of the event wait process. The management node 201 may perform a process depending on the reception event by performing the event wait process.

As described above, the management node 201 calculates a value, by multiplying a recover rate per unit time of each user by a difference between the current time instant and the future time instant is calculated, as a value to be used in allocation of a computing resource at the future time instant. This allows the management node 201 to reflect resource distribution among users to properly distribute resources at the future time instant.

In addition, the management node 201 may determine a user that uses a computing resource at a first time instant, by using a fair share reservation value at the first time instant, which is determined from a value to increase the fair share reservation value at the first time instant and a fair share reservation value at the current time instant. This allows the management node 201 to allocate a computing resource at the first time instant according to the resource distribution of the user.

In addition, when a computing resource requested by a job of the user that uses the computing resource at the first time instant is available at the future time instant, the management node 201 may determine to allocate the computing resource at the first time instant to the job of the user. This allows the management node 201 to reliably allocate a computing node to the job of the user using the computing resource at the first time instant when the first time instant arrives.

In addition, suppose that a computing resource requested by the job that the user using the computing resource at the first time instant has is available at the future time instant. Then, the management node 201 may also calculate a fair share reservation value of the user at the first time instant based on a value to increase the fair share reservation value of the user at the first time instant, a fair share value at the current time instant, and a fair share use amount. In addition, the management node 201 may calculate a fair share reservation value of the user at a second time instant, based on a value to increase a fair share reservation value of the user at the second time instant, the fair share value at the current time instant, and the fair share use amount. Here, the second time instant is a time instant later than the first time instant.

With this, since the management node 201 may implement fair allocation among users after the first time instant, because the fair share reservation value of the user having the job to which allocation is made at the first time instant decreases and is less likely to receive allocation to a job after the first time instant.

In addition, suppose that a computing resource requested by the job that the user using the computing resource at the first time instant has is not at the future time instant. Then, the management node 201 may determine a user that has a job to which a computing resource at the second time instant is to be allocated from multiple users, based on the priority of each user at the second time instant which is later than the first time instant. This allows the management node 201 to allocate the computing resource at the second time instant depending on the resource distribution among the users.

In addition, suppose that the user determined to receive allocation of the computing resource at the first time instant differs from the user determined to receive allocation of the computing resource at the second time instant. Here, the user determined to receive allocation of the computing resource at the second time instant is referred to a second user. When the computing resource at the first time instant is not allocated and a user having higher priority at the second time instant changes, the computing resource at the first time instant is still empty, and likely to be allocated to a job of the second user. Thus, the management node 201 may judge whether or not the computing resource requested by the job issued by the second user is available at the first time instant, and, based on a judgment result made, determine to allocate the computing resource at the first time instant to the job of the second user. This allows the management node 201 to increase an opportunity of being allocated an empty computing resource at the first time instant to thereby effectively utilize the computing resources at the first time instant.

The control method described in this embodiment may be implemented by causing a computer such as a personal computer or a work station or the like to execute a program prepared in advance. This job control program is executed by being recorded in a computer readable recording medium such as a hard disk, a flexible disk, a compact disc read-only memory (CD-ROM), a digital versatile disk (DVD), or the like to execute a program prepared in advance and read from the recording medium by the computer. This job control program may also be distributed by way of a network such as Internet or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel arithmetic device, comprising:
    a plurality of computing nodes; and
    a management node coupled to the plurality of computing nodes and including a computer, the management node being configured to
        calculate an allocation value to allocate a computing resource at a future time instant, by multiplying a degree of increasing a priority of a user of a plurality of users depending on resource distribution to the user as time elapses with a difference between a current time instant and the future time instant, the allocation value being to be used in determining one of the plurality of users that has a job to which the computing resource at a first time instant being later than the current time instant is to be allocated,
        allocate the computing resource at the future time instant based on the calculated allocation value, and
        execute at the future time instant the job with the allocated computing resource.

2. The parallel arithmetic device according to claim 1, wherein the management node is configured to
    calculate the priorities of the users at the first time instant based on the calculated degrees and the priorities of the users at the current time instant, and
    determine a user having a job to which a computing resource at the first time instant is to be allocated from the plurality of users, based on the calculated priorities of the users at the first time instant.

3. The parallel arithmetic device according to claim 2, wherein the management node is configured to
    judge whether a computing resource requested by the job of the user determined to receive allocation of the computing resource at the first time instant is available at the first time instant, and
    based on a result of the judgment, determine to allocate the computing resource at the first time instant to the job of the user.

4. The parallel arithmetic device according to claim 3, wherein the management node is configured to, when the management node judges that the computing resource is available at the first time instant, calculate the priority of the user at any time instant of the first time instant and a second time instant being later than the first time instant, based on a degree of increasing the priority of the user to be used in determining a user having a job to which a computing resource at the any time instant is to be allocated, the priority of the user at the current time instant, and a degree of reducing the priority of the user by allocating the computing resource at the first time instant.

5. The parallel arithmetic device according to claim 3, wherein the management node is configured to, when the management node judges that the computing resource is not available at the first time instant, determine a user having a job to which a computing resource at a second time instant being later than the first time instant is to be allocated, from the plurality of users based on the priorities of the users at the second time instant.

6. The parallel arithmetic device according to claim 5, wherein the management node is configured to:
    judge whether not a computing resource requested by a job of the user determined to receive allocation of the computing resource at the second time instant is available at the first time instant, when the user determined to receive allocation of the computing resource at the first time instant differs from the user determined to receive allocation of the computing resource at the second time instant, and
    based on a result of the judgment, determine to allocate the computing resource at the first time instant to the job of the user determined to receive allocation of the computing resource at the second time instant.

7. A parallel computing system, comprising:
    a plurality of processors,
    wherein any of the plurality of processors is configured to:
        calculate an allocation value to allocate a computing resource at a future time instant, by multiplying a degree of increasing a priority of a user of a plurality of users depending on resource distribution to the user as time elapses with a difference between a current time instant and the future time instant, the allocation value being to be used in determination one of the plurality of users that has a job to which the computing resource at a first time instant being later than the current time instant is to be allocated,
        allocate the computing resource at the future time instant based on the calculated allocation value, and
        execute at the future time instant the job with the allocated computing resource.

8. A job control method executed by a computer, comprising:
    reading a degree of increasing a priority of each of a plurality of users depending on resource distribution to a user of the plurality of users as unit time elapses from a storage section that stores the degree;
    calculating an allocation value to allocate a computing resource at a future time instant, the allocation value being to be used in determining one of the plurality of users that has a job to which a computing resource at a first time instant later than a current time instant is to be allocated, by multiplying the read degree with a difference between the current time instant and the future time instant;
    allocating the computing resource at the future time instant based on the calculated allocation value; and
    executing at the future time instant the job with the allocated computing resource.

* * * * *